US011038645B2

(12) United States Patent
Grant et al.

(10) Patent No.: US 11,038,645 B2
(45) Date of Patent: *Jun. 15, 2021

(54) CONTROLLABLE CSI-RS DENSITY

(71) Applicant: TELEFONAKTIEBOLAGET LM ERICSSON (PUBL), Stockholm (SE)

(72) Inventors: Stephen Grant, Pleasanton, CA (US); Mattias Frenne, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,771

(22) Filed: Apr. 28, 2020

(65) Prior Publication Data
US 2020/0295897 A1 Sep. 17, 2020

Related U.S. Application Data

(63) Continuation of application No. 16/668,272, filed on Oct. 30, 2019, which is a continuation of application
(Continued)

(51) Int. Cl.
*H04L 5/00* (2006.01)
*H04L 1/00* (2006.01)
*H04L 1/16* (2006.01)

(52) U.S. Cl.
CPC .......... *H04L 5/0048* (2013.01); *H04L 1/0009* (2013.01); *H04L 1/1614* (2013.01);
(Continued)

(58) Field of Classification Search
CPC ....... H04L 1/0009; H04L 1/1614; H04L 5/00; H04L 5/0044; H04L 5/0048; H04L 5/0094
See application file for complete search history.

(56) References Cited

U.S. PATENT DOCUMENTS 10,516,513 B2 * 12/2019 Grant .................... H04L 1/1614
2013/0208678 A1 8/2013 Zhang
(Continued)

FOREIGN PATENT DOCUMENTS

CN 103843259 A 6/2014
CN 103918204 A 7/2014
(Continued)

OTHER PUBLICATIONS

Ericsson, "Further discussion on CSI-RS pooling," 3GPP TSG RAN WG1 Meeting #87, R1-1612352; Reno, USA, Nov. 14-18, 2016, 6 pages.
(Continued)

*Primary Examiner* — Kashif Siddiqui

(57) ABSTRACT

Methods and apparatus for configuring, in a network node of a wireless communication network, a reference signal resource. An example method comprises obtaining a combination of one or more components to be used for a reference signal resource, the one or more components being contained in one or more physical resource blocks of a slot; and indicating, to the one or more wireless devices, the combination of the one or more components in the one or more physical resource blocks that are to be used for the reference signal resource.

23 Claims, 29 Drawing Sheets

Related U.S. Application Data

No. 16/196,182, filed on Nov. 20, 2018, now Pat. No. 10,516,513, which is a continuation of application No. PCT/IB2017/057741, filed on Dec. 7, 2017.

(60) Provisional application No. 62/560,019, filed on Sep. 18, 2017, provisional application No. 62/431,743, filed on Dec. 8, 2016.

(52) U.S. Cl.
CPC .............. *H04L 5/00* (2013.01); *H04L 5/0044* (2013.01); *H04L 5/0094* (2013.01)

(56) References Cited

U.S. PATENT DOCUMENTS

| | | | |
|---|---|---|---|
| 2014/0307576 A1* | 10/2014 | Nagata | H04L 5/0094 370/252 |
| 2015/0163730 A1 | 6/2015 | Zhang | |
| 2015/0201346 A1 | 7/2015 | Wu et al. | |
| 2015/0223254 A1* | 8/2015 | Guo | H04W 72/0493 370/312 |
| 2015/0289281 A1 | 10/2015 | Kim et al. | |
| 2016/0006546 A1 | 1/2016 | Yi et al. | |
| 2016/0021551 A1 | 1/2016 | Park et al. | |
| 2016/0088594 A1* | 3/2016 | Xiong | H04L 5/0094 370/329 |
| 2016/0112099 A1 | 4/2016 | Lee et al. | |
| 2016/0174093 A1 | 6/2016 | Zhou et al. | |
| 2016/0301511 A1* | 10/2016 | Yoon | H04B 7/0626 |
| 2018/0091273 A1* | 3/2018 | Choi | H04B 7/0478 |
| 2018/0262252 A1* | 9/2018 | Oh | H04L 5/0048 |
| 2018/0279289 A1* | 9/2018 | Islam | H04L 5/0094 |
| 2019/0233456 A1 | 8/2019 | Liu et al. | |
| 2019/0273544 A1* | 9/2019 | Cha | H04L 1/0026 |

FOREIGN PATENT DOCUMENTS

| | | |
|---|---|---|
| CN | 103959692 A | 7/2014 |
| JP | 2019530691 A | 10/2019 |
| RU | 2449480 C2 | 4/2012 |
| WO | 2015040587 A1 | 3/2015 |

OTHER PUBLICATIONS

Fujitsu, "Aggregated CSI-RS Configuration and Signaling," 3GPP TSG RAN WG1 Meeting #87, R1-1611463; Reno, USA, Nov. 14-18, 2016, 4 pages.

Ericsson, "CSI-RS design," 3GPP TSG RAN WG1 Meeting #87, R1-1612330; Reno, USA, Nov. 14-18, 2016, 6 pages.

Intel Corporation, "Discussion on CSI-RS for Class A FD-MIMO with overhead reduction," 3GPP TSG RAN WG1 Meeting #85, R1-164142; Nanjing, China, May 23-27, 2016, 7 pages.

Ericsson, "CSI-RS Design for Class A FD-MIMO," 3GPP TSG-RAN WG1#83, R1-157204; Anaheim, USA, Nov. 16-20, 2015, 10 pages.

Intel Corporation, "On CSI-RS for NR," 3GPP TSG RAN WG1 Meeting #87, R1-1611977; Reno Nevada, USA, Nov. 14-18, 2016, 5 pages.

Intel Corporation, "Discussion on CSI-RS design for NR," 3GPP TSG RAN WG1 Meeting #86-bis, R1-1609528; Lisbon, Portugal, Oct. 10-14, 2016, 6 pages.

NTT DOCOMO, "Low-density CSI-RS and Port Sharing," 3GPP TSG RAN WG1 Meeting #87, Reno Nevada, USA, Nov. 14-18, 2016, 3 pages.

\* cited by examiner e.g., x = 10

CONTROLLABLE CSI-RS DENSITY

This application is a continuation of U.S. Nonprovisional application Ser. No. 16/668,272, filed Oct. 30, 2019 which is a continuation U.S. Nonprovisional application Ser. No. 16/196,182, filed Nov. 20, 2018, now U.S. Pat. No. 10,516,513, which is continuation of International Application No. PCT/IB2017/057741, filed Dec. 7, 2017, which claims the benefit of U.S. Provisional Application No. 62/560,019, filed Sep. 18, 2017, and U.S. Provisional Application No. 62/431,743, filed Dec. 8, 2016, the disclosures of which are fully incorporated herein by reference.

TECHNICAL FIELD

The disclosed subject matter relates generally to telecommunications and more particularly to control of Channel State Information Reference Signal (CSI-RS) density in channels of a next generation mobile wireless communication system.

BACKGROUND

The next generation mobile wireless communication system (5G or NR), will support a diverse set of use cases and a diverse set of deployment scenarios. The latter includes deployment at both low frequencies (100 s of MHz), similar to LTE today, and very high frequencies (mm waves in the tens of GHz). At high frequencies, propagation characteristics make achieving good coverage challenging. One solution to the coverage issue is to employ high-gain beamforming, typically in an analog manner, in order to achieve satisfactory link budget. Beamforming will also be used at lower frequencies (typically digital beamforming), and is expected to be similar in nature to the already standardized 3GPP LTE system (4G).

For background purposes, some of the key aspects of LTE are described in this section. Of particular relevance is the sub-section describing channel state information reference signals (CSI-RS). A similar signal will be designed also for NR, and is the subject of the present application.

Note that terminology used here such as eNodeB and UE should be considering non-limiting and does in particular not imply a certain hierarchical relation between the two; in general, "eNodeB" could be considered as device 1 and "UE" device 2, and these two devices communicate with each other over some radio channel. Herein, we also focus on wireless transmissions in the downlink, but the invention is equally applicable in the uplink.

LTE and NR use OFDM in the downlink and DFT-spread OFDM or OFDM in the uplink. The basic LTE or NR downlink physical resource can thus be seen as a time-frequency grid as illustrated in FIG. 6, where each resource element corresponds to one OFDM subcarrier during one OFDM symbol interval.

Moreover, as shown in FIG. 7, in the time domain, LTE downlink transmissions are organized into radio frames of 10 milliseconds, each radio frame consisting of ten equally-sized subframes of length $T_{subframe}=1$ millisecond.

Furthermore, the resource allocation in LTE is typically described in terms of resource blocks, where a resource block corresponds to one slot (0.5 millisecond) in the time domain and 12 contiguous subcarriers in the frequency domain. Resource blocks are numbered in the frequency domain, starting with 0 from one end of the system bandwidth. For NR, a resource block is also 12 subcarriers in frequency, but the number of OFDM symbols in the NR resource block has not yet been determined. It will be appreciated that the term "resource block," as used herein, will thus refer to a block of resources spanning a certain number of subcarriers and a certain number of OFDM symbols—the term as used herein may, in some instances, refer to a different sized block of resources from what is ultimately labeled a "resource block" in the standards for NR or in the standards for some other system.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe in LTE, and in 1 or 2 OFDM symbols in NR. A downlink system with 3 OFDM symbols as control is illustrated in the downlink subframe illustrated in FIG. 8.

Codebook-Based Precoding

Multi-antenna techniques can significantly increase the data rates and reliability of a wireless communication system. The performance is particularly improved if both the transmitter and the receiver are equipped with multiple antennas, which results in a multiple-input multiple-output (MIMO) communication channel. Such systems and/or related techniques are commonly referred to as MIMO.

NR is currently evolving with MIMO support. A core component in NR is the support of MIMO antenna deployments and MIMO related techniques including beamforming at higher carrier frequencies. Currently, LTE and NR support an 8-layer spatial multiplexing mode for up to 32 Tx antennas with channel-dependent precoding. The spatial multiplexing mode is aimed for high data rates in favorable channel conditions. An illustration of the spatial multiplexing operation is provided in FIG. 9.

As seen, the information carrying symbol vector s is multiplied by an $N_T \times r$ precoder matrix W, which serves to distribute the transmit energy in a subspace of the $N_T$- (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved, since multiple symbols can be transmitted simultaneously over the same time/frequency resource element (TFRE). The number of symbols r is typically adapted to suit the current channel properties.

LTE and NR use OFDM in the downlink and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder, implemented by precoder matrix W, can be a wideband precoder that is constant over frequency or that is frequency selective.

The precoder matrix is often chosen to match the characteristics of the $N_R \times N_T$ MIMO channel matrix $H_n$, resulting in so-called channel-dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. For efficient performance, it is important that a transmission rank that matches the channel properties is selected.

Channel State Information Reference Symbols (CSI-RS)

In LTE and $N_R$, a reference symbol sequence was introduced for the purpose of estimating channel-state information, the CSI-RS. The CSI-RS provides several advantages over basing the CSI feedback on the common reference symbols (CRS) which were used, for that purpose, in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a UE specific manner).

By measuring on a CSI-RS, a UE can estimate the effective channel the CSI-RS is traversing, including the radio propagation channel and antenna gains. In more mathematical rigor, this implies that if a known CSI-RS signal x is transmitted, a UE can estimate the coupling between the transmitted signal and the received signal (i.e., the effective channel). Hence if no virtualization is performed in the transmission, the received signal y can be expressed as $$y=Hx+e$$

and the UE can estimate the effective channel H.

Up to 32 CSI-RS ports can be configured for a LTE or NR UE, that is, the UE can thus estimate the channel from up to eight transmit antennas.

An antenna port is equivalent to a reference signal resource that the UE shall use to measure the channel. Hence, a base station with two antennas could define two CSI-RS ports, where each port is a set of resource elements in the time frequency grid within a subframe or slot. The base station transmits each of these two reference signals from each of the two antennas so that the UE can measure the two radio channels and report channel state information back to the base station based on these measurements. In LTE, CSI-RS resources with 1, 2, 4, 8, 12, 16, 20, 24, 28 and 32 ports are supported.

The CSI-RS utilizes an orthogonal cover code (OCC) of length two, to overlay two antenna ports on two consecutive REs. As seen in FIG. 10, which depicts resource element grids over an RB pair with potential positions for LTE Rel-9/10 UE specific RS (yellow), CSI-RS (marked with a number corresponding to the CSI-RS antenna port), and CRS (blue and dark blue), many different CSI-RS patterns are available. For the case of 2 CSI-RS antenna ports there are 20 different patterns within a subframe. The corresponding number of patterns is 10 and 5 for 4 and 8 CSI-RS antenna ports, respectively. For TDD, some additional CSI-RS patterns are available.

The CSI reference signal configurations are given by the table below, taken from LTE specifications TS 36.211 v.12.5.0. For example, the CSI RS configuration 5 for 4 antennas ports use (k',l')=(9,5) in slot 1 (the second slot of the subframe), and according to the formulas below, port 15,16, use OCC over the resource elements (k,l)=(9,5), (9,6) and port 17,18 use OCC over resource elements (3,5)(3,6) respectively (assuming PRB index m=0), where k is the subcarrier index and l is the OFDM symbol index.

The orthogonal cover code (OCC) is introduced below by the factor $w_{l''}$ $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configuration 0-19,} \\ & \text{normal cyclic prefix} \\ 2l'' & \text{CSI reference signal configuration 20-31,} \\ & \text{normal cyclic prefix} \\ l'' & \text{CSI reference signal configuration 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

TABLE 6.10.5.2-1

Mapping from CSI reference signal configuration to (k', l') for normal cyclic prefix

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |

TABLE 6.10.5.2-1-continued

Mapping from CSI reference signal configuration to (k', l') for normal cyclic prefix

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 29 | (2, 1) | 1 | | | | |
| 30 | (1, 1) | 1 | | | | |
| 31 | (0, 1) | 1 | | | | |

2D Antenna Arrays

In LTE, support for two-dimensional antenna arrays was introduced where each antenna element has an independent phase and amplitude control, thereby enabling beamforming in both in the vertical and the horizontal dimensions. Such antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N=N_h N_v N_p$. An example of an antenna where $N_h=8$ and $N_v=4$ is illustrated in FIG. 11, which illustrates on the left side thereof a two-dimensional antenna array of cross-polarized antenna elements ($N_p=2$), with $N_h=4$ horizontal antenna elements and $N_v=8$ vertical antenna elements, and on the right side of FIG. 11 the actual port layout with 2 vertical ports and 4 horizontal ports is illustrated. This could for instance be obtained by virtualizing each port by 4 vertical antenna elements. Hence, assuming cross-polarized ports are present, the UE will measure 16 antenna ports in this example.

However, from a standardization perspective, the actual number of elements antenna array is not visible to the UE, but rather the antenna ports, where each ports corresponds to a CSI reference signal. The UE can thus measure the channel from each of these ports. Therefore, we introduce a 2D port layout, described by the number of antenna ports in the horizontal dimension $M_h$, the number of antenna rows corresponding to the vertical dimension $M_v$ and the number of dimensions corresponding to different polarizations $M_p$. The total number of antenna ports is thus $M=M_h M_v M_p$. The mapping of these ports on to the N antenna elements is an eNB implementation issue and thus not visible by the UE. The UE does not even know the value of N; it only knows the value of the number of ports M.

Precoding may be interpreted as multiplying the signal with different beamforming weights for each antenna port prior to transmission. A typical approach is to tailor the precoder to the antenna form factor, i.e. taking into account $M_h$, $M_v$, and $M_p$ when designing the precoder codebook.

A common approach when designing precoder codebooks tailored for 2D antenna arrays is to combine precoders tailored for a horizontal array and a vertical array of antenna ports respectively by means of a Kronecker product. This means that (at least part of) the precoder can be described as a function of $$W_H \otimes W_V$$

where $W_H$ is a horizontal precoder taken from a (sub)-codebook $X_H$ containing $N_H$ codewords and similarly $W_V$ is a vertical precoder taken from a (sub)-codebook $X_V$ containing $N_V$ codewords. The joint codebook, denoted by $X_H \otimes X_V$, thus contains $N_H \cdot N_V$ codewords. The codewords of $X_H$ are indexed with k=0, ..., $N_H-1$, the codewords of $X_V$ are indexed with l=0, ..., $N_V-1$ and the codewords of the joint codebook $X_H \otimes X_V$ are indexed with m=$N_V$·k+l meaning that m=0, ..., $N_H \cdot N_V-1$.

For LTE Rel-12 UE and earlier, only a codebook feedback for a 1D port layout is supported, with 2, 4 or 8 antenna ports. Hence, the codebook is designed assuming these ports are arranged on a straight line.

Periodic CSI Reporting on a Subset of 2D Antenna Ports

A method has been proposed to use measurements on fewer CSI-RS ports for periodic CSI reports than measurements for the aperiodic CSI reports.

In one scenario, the periodic CSI report framework is identical to legacy terminal periodic CSI report framework. Hence, periodic CSI reports with 2, 4 or 8 CSI-RS ports are used for the P-CSI reporting and additional ports are used for the A-CSI reporting. From UE and eNB perspective, the operations related to periodic CSI reporting is identical to legacy operation.

The full, large 2D port layout CSI measurements of up to 64 ports or even more is only present in the aperiodic reports. Since A-CSI is carried over PUSCH, the payload can be much larger than the small 11-bit limit of the P-CSI using PUCCH format 2.

CSI-RS Resource Allocation for a 2D Antenna Array

It has been agreed that for 12 or 16 ports, a CSI-RS resource for class A CSI reporting is composed as an aggregation of K CSI-RS configurations each with N ports. In case of CDM-2, the K CSI-RS resource configurations indicate CSI-RS RE locations according to legacy resource configurations in TS36.211. For 16 ports:

$$(N,K)=(8,2),(2,8)$$

For 12 port construction:

$$(N,K)=(4,3),(2,6)$$

The ports of the aggregated resource correspond to the ports of component resources according to the following:

The aggregated port numbers are 15, 16, ... 30 (for 16 CSI-RS ports)

The aggregated port numbers are 15, 16, ... 26 (for 12 CSI-RS ports)

CSI-RS Antenna Port Numbering

For a given P antenna ports, the Rel-10,12 and 13 precoding codebooks are designed so that the P/2 first antenna ports (e.g. 15-22) should map to a set of co-polarized antennas and the P/2 last antenna ports (e.g. 16-30) are mapped to another set of co-polarized antennas, with an orthogonal polarization to the first set. This is thus targeting cross-polarized antenna arrays. FIG. 12 illustrates antenna port numbering for a case of P=8 ports.

Hence, the codebook principles for the rank 1 case are that a DFT "beam" vector is chosen for each set of P/2 ports and a phase shift with QPSK alphabet is used to co-phase the two sets of antenna ports. A rank 1 codebook is thus constructed as $$\begin{pmatrix} a \\ ae^{i\omega} \end{pmatrix}$$

where a is a length P/2 vector that forms a beam for the first and second polarizations respectively and ω is a co-phasing scalar that co-phases the two orthogonal polarizations.

Using CSI-RS Signals in NR

In NR, the CSI-RS signal needs to be designed and used for at least similar purposes as in LTE. However, the $N_R$ CSI-RS is expected to fulfill additional purposes such as beam management. Beam management is a process whereby eNB and UE beams are tracked which includes finding, maintaining, and switching between suitable beams as UEs move both within and between the coverage areas of multi-beam transmit-receive points (TRPs). This is accomplished by UEs performing measurements on the CSI-RS reference signals and feeding these measurements back to the network for the purposes of beam management decisions.

It is thus a problem how to design a CSI-RS that can be used for "LTE type" of functionality as well as for beam management functionality with both digital and analog beamforming.

An additional point of difference between NR and LTE is that NR will support flexible numerology, i.e., scalable sub-carrier spacing (SCS) with a nominal value of 15 kHZ. The nominal value is scalable in powers of 2, i.e., $f_{SC}=15*2^n$ kHz where n=−2, −1, 0, 1, 2, 3, 4, 5. This affects the CSI-RS structure, as larger subcarrier spacings mean that resource elements (REs) can become more spread out in the frequency dimension and this results in a larger distance in frequency between CSI-RS. It is thus a problem how to design CSI-RS to be able to adjust the frequency density depending on the SCS.

One more possible point of difference is that NR may support a shorter transmission duration than LTE. The NR transmission duration is a slot where a slot can be either 7 or 14 OFDM symbols long. In contrast, the transmission duration in LTE is fixed at one subframe which equals 14 symbols.

Additionally, because there is no common reference signals (CRS) in NR, the placement of CSI-RS in NR is not restricted to avoid collisions with NR. Thus, greater flexibility may be used in the design of CSI-RS for NR.

SUMMARY

Several of the techniques and apparatus described herein address the above issues and provide greater flexibility in the design and use of CSI-RS for NR.

Embodiments of the presently disclosed invention include a method that includes a step in which a combination of one or more units or components to be used for a reference signal resource is obtained. The combination may be obtained based on one or more criteria and/or predetermined rules including, for example, a desired density characteristic of the reference signal resource, a number of ports configured for one or more wireless devices by which the reference signal resource will be used. This obtaining may comprise, for example, aggregating the one or more components across two or more physical resource blocks, to form the reference signal resource. This aggregating may be done such that there is one, or several, REs per port, per PRB among the PRBs used to carry the reference signal. This example method further comprises a step in which the combination of the one or more components in the one or more physical resource blocks that are to be used for the reference signal resource are indicated to one or more wireless devices.

In some embodiments of the methods summarized above, each physical resource block spans a plurality of subcarriers, and indicating the combination of the one or more components includes indicating one or more subcarrier indexes. In some embodiments, the one or more subcarrier indexes are indicated to the one or more wireless devices using one or more bitmaps. In some of these embodiments, each bit in the bitmap uniquely corresponds to a subcarrier index, such that a set bit in the bitmap indicates that a component located at a subcarrier index corresponding to the set bit is part of a combination of one or more components used for the reference signal resource. In some embodiments, the number of bits in each of the one or more bitmaps depends on a number of subcarriers in a component. In some embodiments, the number of bits in each of the one or more bitmaps may be half the number of subcarriers in the PRB, for example.

In some embodiments, each of the components corresponds to two or more subcarriers, the two or more subcarriers of each component being adjacent in frequency. In some of these embodiments, each component may also correspond to two or more adjacent symbols.

The reference signal resource in the above method may be a CSI-RS resource, in some embodiments. This CSI-RS resource may be used by the one or more wireless devices to perform CSI measurements, for example. In some embodiments, the reference signal resource is used to perform at least one of link adaptation for the one or more wireless devices and beam management for the one or more wireless devices. This beam management may include beam selection, such as selection of a transmit beam transmitted by a network node and/or a receive beam received by a wireless device.

Other embodiments include methods of operating a wireless device. An example method comprises a step in which an indication is received, from a network node, of a combination of one or more components contained in one or more physical resource blocks of a slot. This example method further comprises a step in which the indicated combination of one or more components is used for a reference signal resource.

In some embodiments, the indicated combination consists of one RE per port, per physical resource block of the one or more physical resource blocks of the slot. In some embodiments, each physical resource block spans a plurality of subcarriers, and the indication of the combination of the one or more components includes an indication of one or more subcarrier indexes. In some of these latter embodiments, the indication of the one or more subcarrier indexes may include one or more bitmaps. The number of bits in each of the one or more bitmaps may depend on a number of subcarriers in a component. In some embodiments, each bit in the bitmap uniquely corresponds to a subcarrier index, such that a set bit in the bitmap indicates that a component located at a subcarrier index corresponding to the set bit is part of the combination of one or more components used for the reference signal resource. In some of these embodiments, the number of bits in each of the one or more bitmaps is half a number of subcarriers in the physical resource block.

In some embodiments, each of the components corresponds to two or more subcarriers, the two or more subcarriers of each component being adjacent in frequency. In some of these embodiments, each component may also correspond to two or more adjacent symbols.

The reference signal resource in the above methods may be a CSI-RS resource, in some embodiments. This CSI-RS resource may be used by the one or more wireless devices to perform CSI measurements, for example. In some embodiments, the reference signal resource is used to perform at least one of link adaptation for the one or more wireless devices and beam management for the one or more wireless devices. This beam management may include beam selection, such as selection of a transmit beam transmitted by a network node and/or a receive beam received by a wireless device.

Other embodiments of the present invention include apparatuses corresponding to the above-summarized methods and configured to carry out one or more of these methods, or variants thereof. Thus, embodiments include a network node for use in a wireless communication network, the network node being adapted to obtain a combination of one or more components to be used for a reference signal resource, the one or more components being contained in one or more physical resource blocks of a slot, and to indicate, to the one or more wireless devices, the combination of the one or more components in the one or more physical resource blocks that are to be used for the reference signal resource. Likewise, other embodiments include a wireless device adapted to receive an indication, from a network node, of a combination of one or more components contained in one or more physical resource blocks of a slot, and to use the indicated combination of one or more components for a reference signal resource. The variations of these techniques as summarized above and as described in further detail below are equally applicable to the method and apparatus embodiments disclosed herein.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
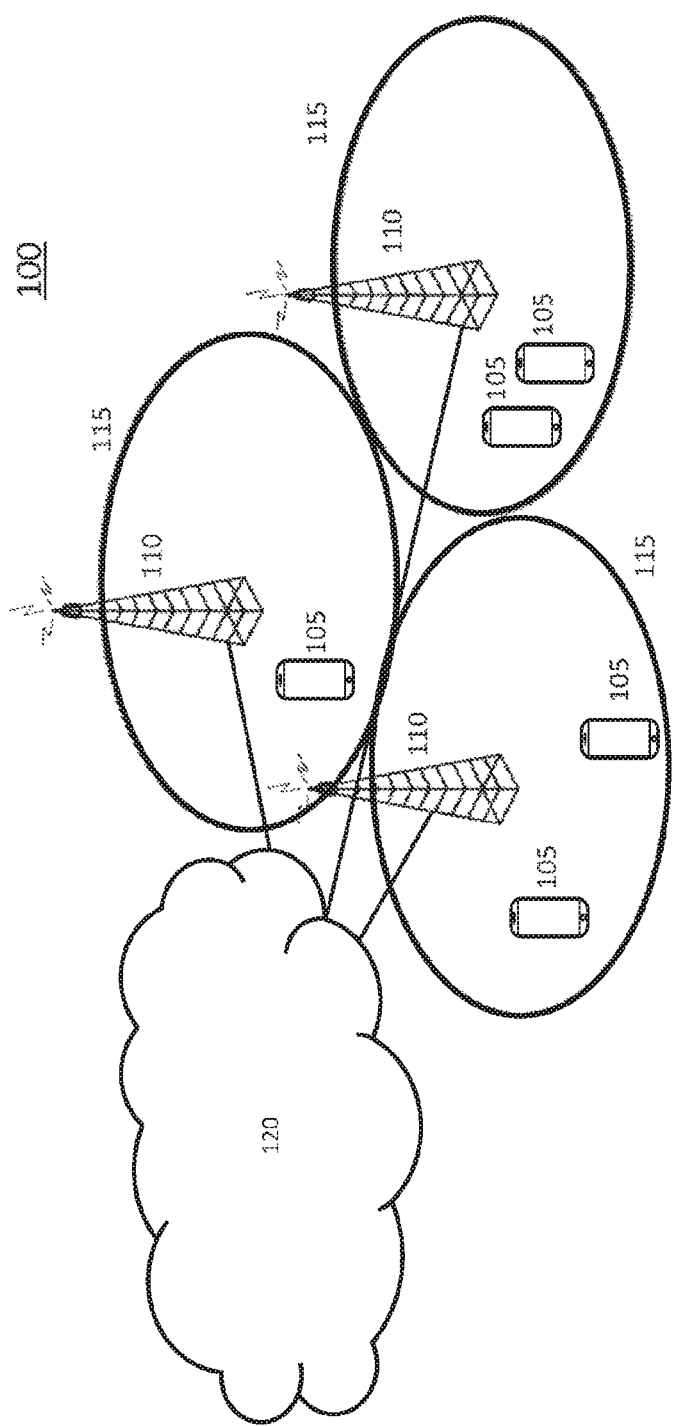
FIG. 1 is a diagram illustrating an LTE network.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Radio Node: As used herein, a "radio node" is either a radio access node or a wireless device.

Controlling Node: As used herein, a "controlling node" either a radio access node or a wireless device used to manage, control or configure another node.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), an Evolved-Serving Mobile Location Center (E-SMLC), a Packet Data Network (PDN) Gateway (P-GW), a Service Capability Exposure Function (SCEF), or the like.

Wireless Device: As used herein, a "wireless device" is any type of device that is capable of wirelessly transmitting and/or receiving signals to/from another wireless device or to/from a network node in a cellular communications network to obtain has access to (i.e., be served by) the cellular communications network. Some examples of a wireless device include, but are not limited to, a User Equipment (UE) in a 3GPP network, a Machine Type Communication (MTC) device, an NB-IoT device, a FeMTC device, etc.

Network Node: As used herein, a "network node" is any node that is either part of the radio access network or the CN of a cellular communications network/system or a test equipment node.

Signaling: As used herein, "signaling" comprises any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The differences between LTE and NR drive a design for CSI-RS that is very flexible in terms of the CSI-RS resource density both in the time and frequency dimensions. For example, for large subcarrier spacings (e.g., 240 kHz), it is necessary to have a significantly higher density in the frequency domain than for the nominal subcarrier spacing of 15 kHz so as to maintain similarly spaced samples of the frequency selective channel. On the other hand, for beam management purposes, it is often necessary to have a fairly spare density in frequency. Hence, what is needed for NR is a very flexible and configurable/controllable density to suit a wide range of use cases. This high flexibility is lacking from the LTE CSI-RS design.

A CSI-RS design with a highly flexible/controllable CSI-RS antenna port density is desirable for NR. According to some of the presently disclosed techniques, the density may be controlled in one or both of two general ways:

The number of ports assigned to an aggregated CSI-RS resource is configurable by the network. Fewer ports assigned to a resource translates to higher port density and vice versa.

Subsampling of the aggregated CSI-RS in the frequency domain is configurable by network. Increased subsampling of a resource translates to lower port density and vice versa.

Flexible/controllable CSI-RS port density allows a single CSI-RS framework to be easily adapted to suit a wide range of use cases and deployment scenarios necessary for NR. The foregoing two general control features may be used individually or jointly to suit the scenario of interest. Such flexibility improves NR system performance across all subcarrier spacings and operating carrier frequencies, for both analog beamforming and digital front ends.

According to some embodiments of the presently disclosed techniques, a basic CSI-RS "component" or "unit" may be defined as two adjacent resource elements (REs) contained within one OFDM symbol in a slot. Examples described herein use this definition of a CSI-RS component, but embodiments of the invention are not limited to this definition. For example, a CSI-RS component may be defined to include more or fewer REs, e.g., four adjacent REs contained within one OFDM symbol, or two adjacent REs contained within two adjacent OFDM symbols. The embodiments described herein with smaller components may be suitably adapted to accommodate such larger components without loss of the advantages described herein. The use of CSI-RS components, whatever their particular size, facilitates a modular approach, which then can be extended to support various needs and use cases of a NR deployment. A technical advantage of the basic unit being two REs adjacent in frequency, for example, but in same symbol, compared to the different approach used in LTE, is better flexibility in overlapping these with other reference signals, such as the new tracking reference signal designed for NR.

The CSI-RS units may be aggregated to form a CSI-RS resource. The CSI-RS resource is signaled from the network (gNB, eNB, TRP, ... ) to the UE and the UE then performs CSI measurements on this CSI-RS resource and the UE feeds back CSI measurement reports to the network. The network then uses this information for link adaptation and/or beam selection and/or beam management.

Figure 13:
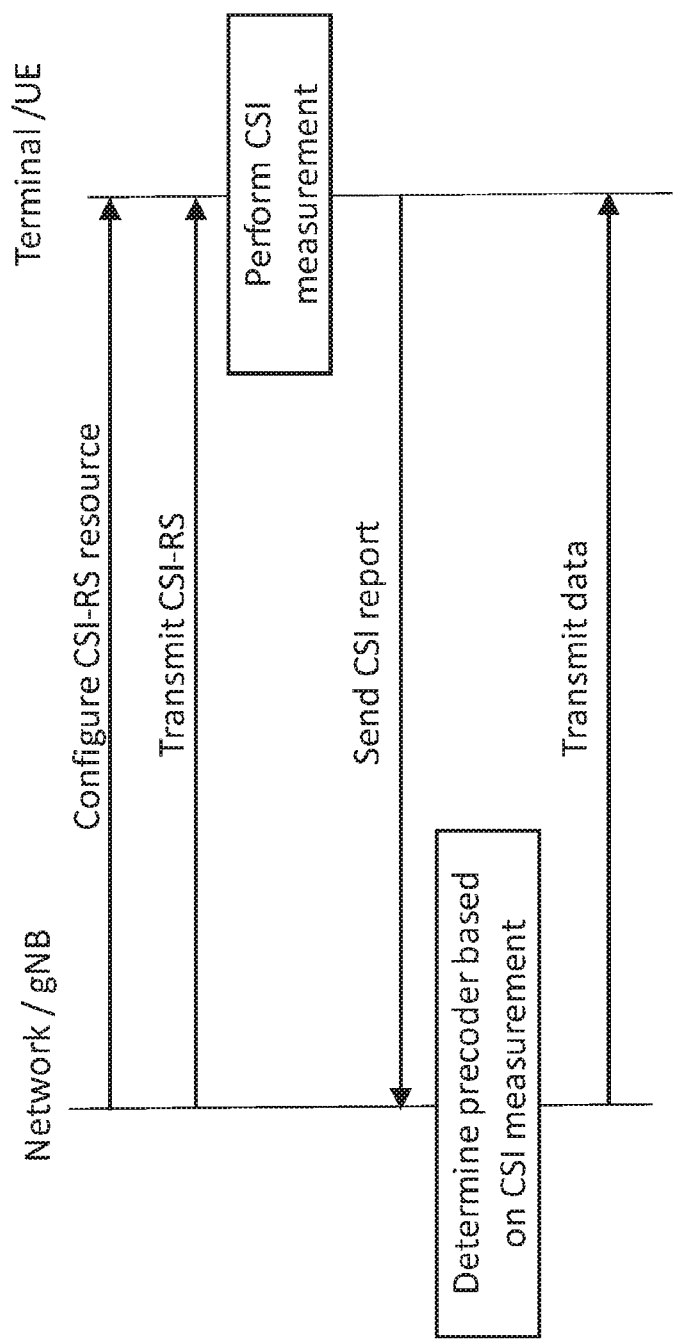
FIG. 13 is an example signaling diagram between a radio access node of a wireless communications network and a wireless communication device.

FIG. 13 depicts a signaling diagram between a radio access node of a wireless communications network (denoted "Network/gNB") and a wireless communication device (denoted "Terminal/UE") in which the network configures CSI-RS resources for CSI feedback and transmits CSI-RS to the wireless communication device/UE. Measurements are then performed in the UE, and a CSI report is sent as feedback to the network. Data may then be transmitted from the radio access node to the wireless communication device, e.g., based on a precoder that is determined from the CSI reports.

Figure 14:
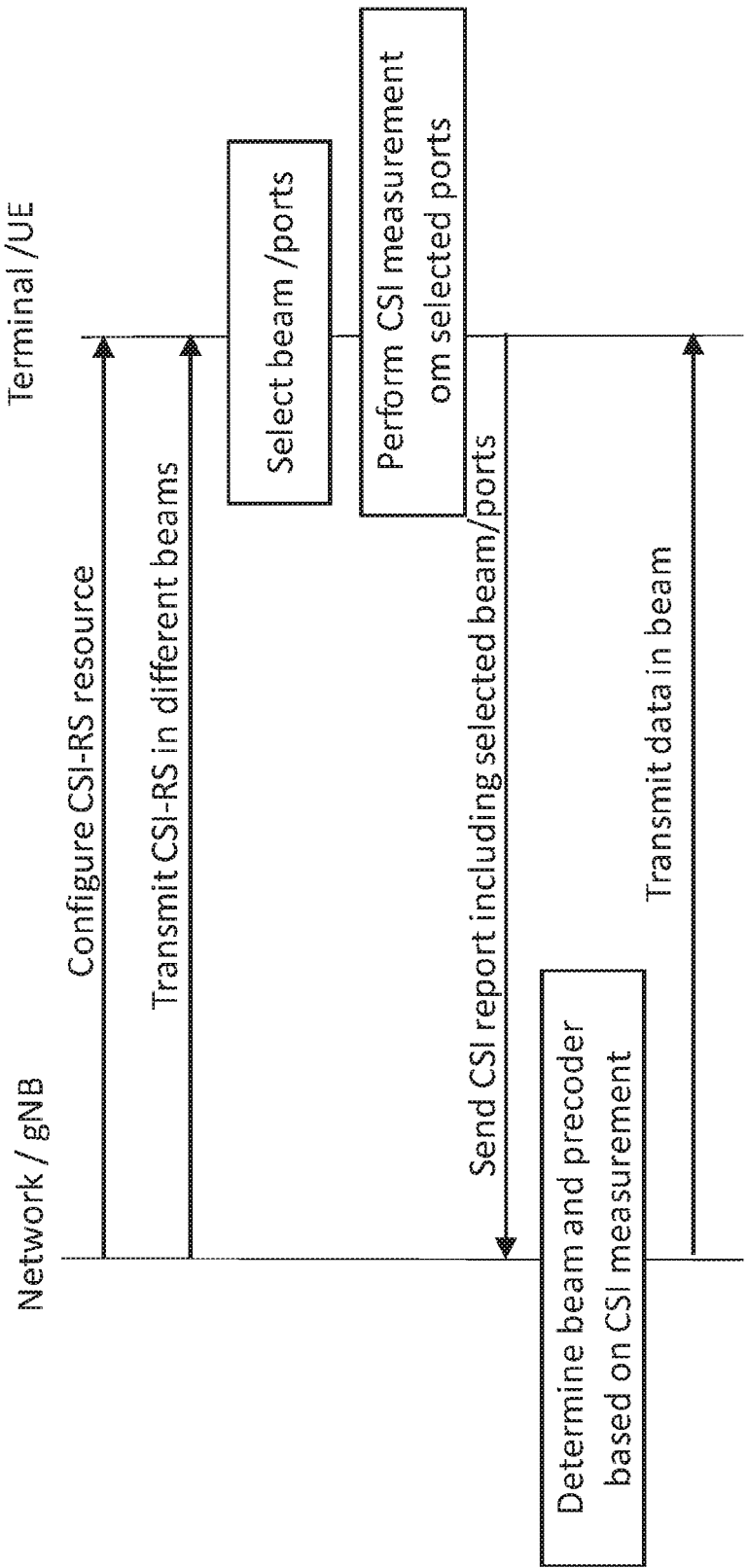
FIG. 14 is another example signaling diagram between a radio access node of a wireless communications network and a wireless communication device.

FIG. 14 depicts a similar signaling diagram. However, in FIG. 14, a beam management setup is also depicted, in which the wireless communication device selects beams. More particularly, the CSI-RS resource contains N ports which are divided into B beams, so that each beam has N/B ports. The wireless communication device selects the desired subset of N/B ports, i.e. the beam, to use for the CSI feedback.

Figure 15:
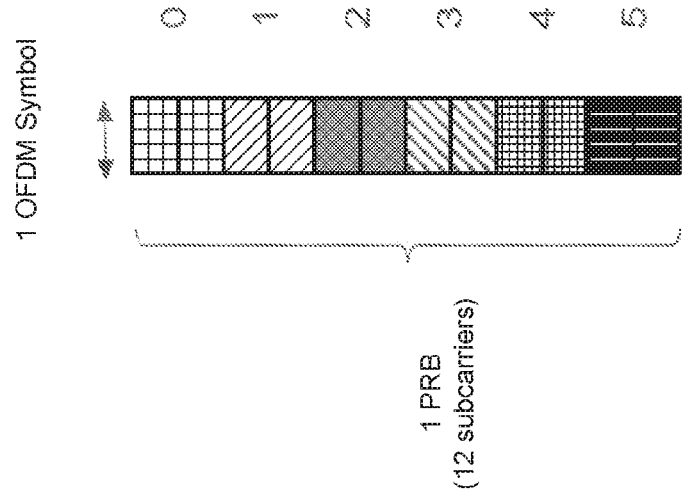
FIG. 15 is a graphical illustration of an OFDM symbol having six CSI-RS units in one PRB.

FIG. 15 depicts an OFDM symbol in a slot having six CSI-RS units that fit within one PRB (12 subcarriers). Each different color represents a different unit. A length-6 bitmap may be used to indicate from the network to the UE whether each of the units or combinations (aggregations) of units are part of a CSI-RS resource or not. The bitmap values for each individual CSI-RS unit are shown in Table 1 below.

TABLE 1

Bitmap values for each individual CSI-RS unit

| CSI-RS Unit | Length-6 Bitmap |
|---|---|
| 0 | 100000 |
| 1 | 010000 |
| 2 | 001000 |
| 3 | 000100 |
| 4 | 000010 |
| 5 | 000001 |

Embodiments of the presently disclosed techniques are not limited to using a length-6 bitmap as described above. For example, if a CSI-RS unit spans more than two subcarriers and/or more than one symbol, the length of the bitmap may be reduced (e.g., a length-3 bitmap for a CSI-RS units that span four subcarriers). Thus, a number of bits in the bitmap may depend on, e.g., be inversely proportional to, a number of subcarriers in the unit. Additionally, if a CSI-RS unit is allowed to have a starting subcarrier index (or anchor location) placed on a finer grid than every second subcarrier, e.g., any subcarrier, then the length of the bitmap could be greater than six. In this case the number of bitmap combinations would need to be restricted to account for the fact that units cannot overlap.

Figure 16:
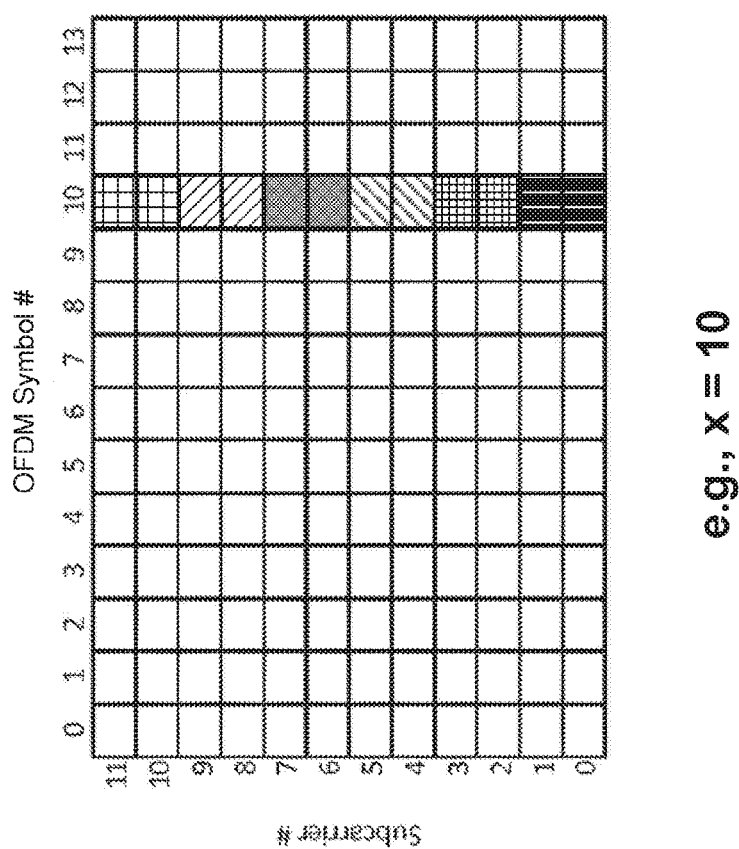
FIG. 16 is a graphical illustration of two different NR slot sizes and the example location of CSI-RS units therein.

As shown in FIG. 15, where the bit indices are shown on the right-hand side of the figure, each bit in the bitmap uniquely corresponds to a subcarrier index, such that a set bit in the bitmap indicates that a component located at a subcarrier index corresponding to the set bit is part of the combination of one or more components used for the reference signal resource. The location of the CSI-RS units within a slot are described in specifications by the "anchor locations" listed in Table 2 below. In each row of this table, the first value of the anchor location indicates a subcarrier index and the second value 'x' indicates an OFDM symbol index where x={0, 1, 2, . . . , 6} in the case of a 7-symbol slot and x={0, 1, 2, . . . , 13} for the case of a 14 symbol slot. Example locations for a 14-symbol slot PRB, where x=10, is shown in FIG. 16. In the examples discussed herein, a component that starts at a subcarrier index is said to be located at that subcarrier index. However, other embodiments are contemplated in which the location of a component is referenced by the subcarrier index at which the component ends. Thus, a component that is located at a subcarrier index may start at the subcarrier index or end at the subcarrier index.

TABLE 2

Anchor locations for CSI-RS units.

| CSI-RS Unit | Anchor Location |
| --- | --- |
| 0 | (11, x) |
| 1 | (9, x) |
| 2 | (7, x) |
| 3 | (5, x) |
| 4 | (3, x) |
| 5 | (1, x) |

A CSI-RS resource is defined as an aggregation of one or more CSI-RS units and further also with a port assignment which is also signaled from the network to the UE. Moreover, a CSI-RS resource may also include the resource blocks for which the CSI-RS resource is valid. In some cases, the CSI-RS does not span the whole system bandwidth but only a partial bandwidth. Note that the figures shown in the present application only show a single or two RBs, but these RB patterns may be repeated over the whole configured set of RBs (typically the whole system bandwidth, or the bandwidth for which the UE supports CSI measurements).

In the next two subsections, the flexible aggregation part is described followed by the flexible port assignment part. Together these comprise one aspect of several embodiments of the presently disclosed techniques and apparatus. Another aspect of some embodiments (flexible resource subsampling) is described in the $3^{rd}$ sub-section.

Flexible Resource Aggregation

A CSI-RS resource in several embodiments of the present invention is defined as the flexible aggregation of (a) resource units per OFDM symbol, and (b) OFDM symbols plus a port assignment to the aggregated resource. The definition of the CSI-RS may possibly also include the supported set of multiple RBs over where this CSI-RS port extends.

For (b), the aggregated OFDM symbols may be either contiguous/adjacent or non-contiguous. For ease of discussion, it is assumed that the OFDM symbols comprising the resource are contained within the same slot. However, in some embodiments they may span more than one slot. A use case for non-contiguous OFDM symbols in a CSI-RS resource within a slot can be to support frequency error estimation and tracking for the UE (which requires some time spacing between the reference signals for accuracy).

Figure 17:
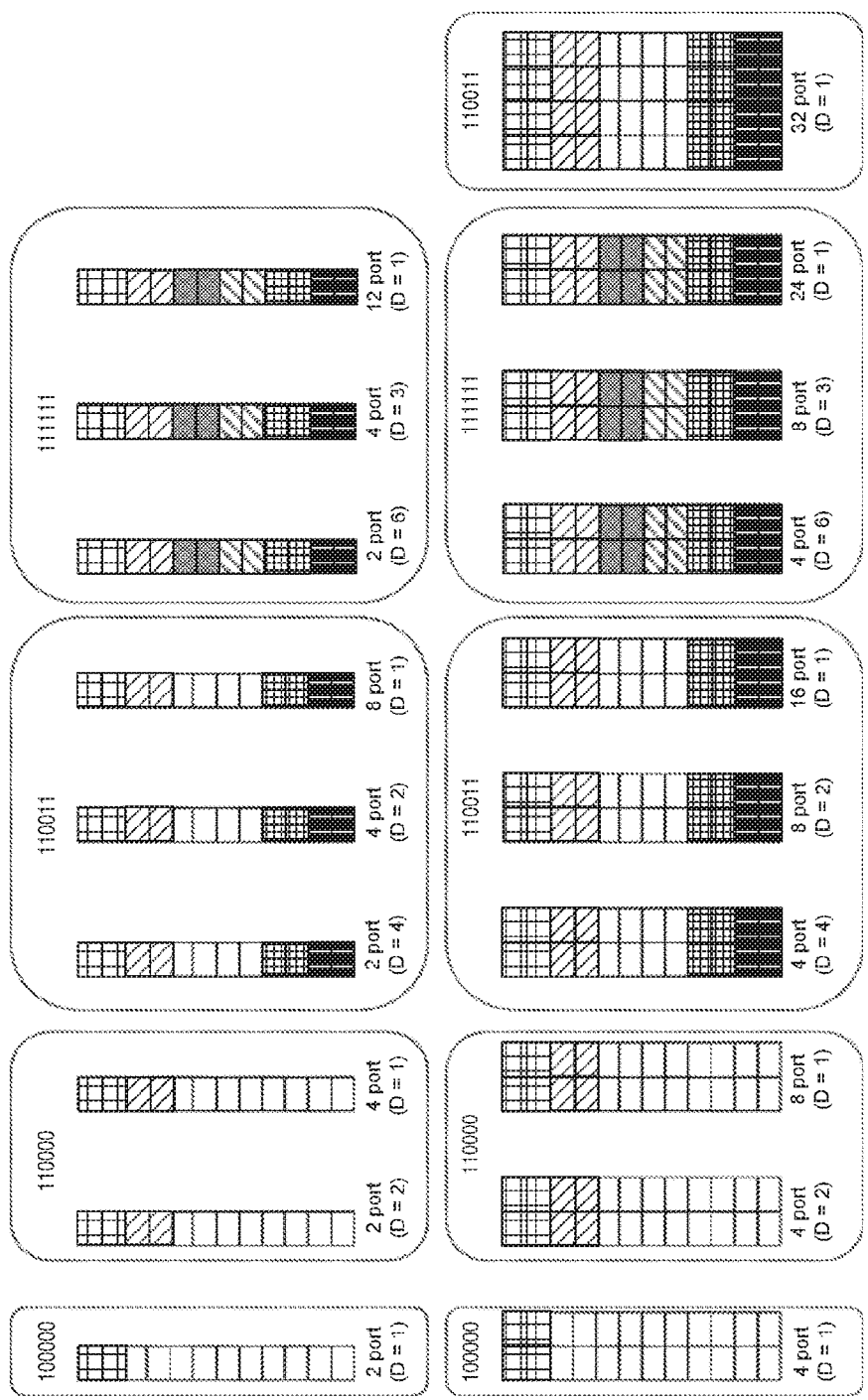
FIG. 17 is a graphical illustration of various resource allocation configurations in which CSI-RS units may be aggregated.

FIG. 17 shows exemplary aggregations for the case of 1, 2, and 4 contiguous OFDM symbols. The bitmap at the top of each box indicates the CSI-RS units that form the basis of the aggregation per OFDM symbol. For example, bitmap 110011 indicates that the aggregation is formed from 4 different CSI-RS units: 1 (the top two subcarriers in each OFDM symbol), 2 (the next two subcarriers), 5 (the pair of subcarriers just above the bottom two subcarriers), and 6 (the bottom two subcarriers). The OFDM symbol location for a 1 symbol CSI-RS resource may be specified by a symbol index $l_0$. For a 2 contiguous symbol or a 4 contiguous symbol CSI-RS resource, the symbols may be restricted to always being adjacent, in which case the symbol locations are specified by the symbol indexes $l_0$ and $l_0+1$, for a 2 symbol CSI-RS resource, or the symbol indexes $l_0$, $l_0+1$, $l_0+2$, and $l_0+3$ for a 4 symbol CSI-RS resource. The wireless device receiving the bitmap may be configured by the network to recognize how many adjacent symbols the bitmap applies to.

Although the CSI-RS units that form the basis for the CSI-RS resource may span 1, 2, or 4 contiguous symbol indexes, a single bitmap may be used to indicate which subcarrier indexes are part of the combination of CSI-RS units at each symbol index, as shown in examples of FIG. 17 with 2 and 4 symbol aggregations. By using a single bitmap to indicate the combination of the one or more components located in each of multiple symbol indexes excess signaling is reduced.

With such resource aggregations that span both time (OFDM symbols) and frequency (subcarriers, i.e. units), in some embodiments, orthogonal cover codes (OCCs) may be applied as in LTE within and/or between CSI-RS units. The use of OCCs is useful in order to collect more energy per port if they are applied across time. If they are applied across frequency, larger CSI-RS power boosting may be applied without violating a potential fixed threshold on the peak to average power ratio across resource elements.

Figure 21:
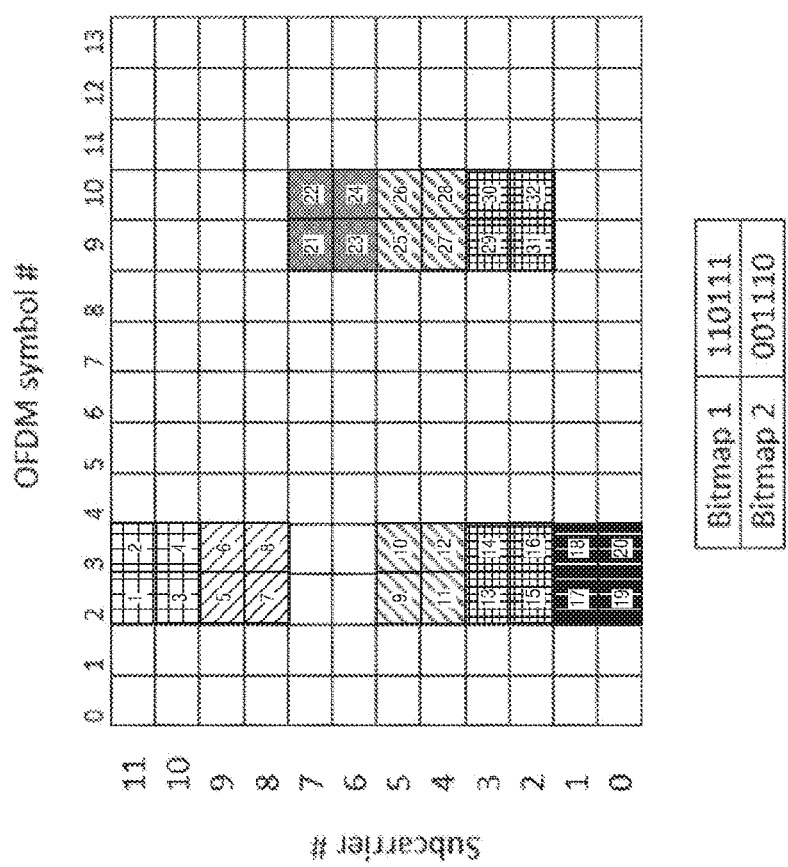
FIG. 21 is a graphical illustration of two different NR slot sizes and the example location of CSI-RS units therein when two bitmaps are used to indicate CSI-RS combinations.

In some embodiments, the CSI-RS units of a CSI-RS resource may be located at two different symbol index anchor locations of a slot and the CSI-RS units at each anchor location may be indicated to the UE with a different bitmap, e.g., a first bitmap indicating the CSI-RS units used at a first anchor location and a second bitmap indicating the CSI-RS units used at a second anchor location. The use of two bitmaps allows for more flexibility in the definition of a CSI-RS resource. For example, the two bitmaps facilitate separate adjustment of the CSI-RS resource at the two different anchor locations to fit around other possible reference signals or physical channels, either for the same user or different users. Moreover, the CSI-RS units at each anchor location may be repeated at a symbol index adjacent to the anchor location. In other words, each anchor location may indicate to the UE a pair of adjacent symbol indexes used for CSI-RS units to the UE. Thus, two bitmaps are communicated from the network to the UE, each bitmap corresponding to a different pair of non-adjacent symbols. The anchor locations of the pairwise non-adjacent symbols may be specified by the symbol indexes $l_0$ and $l_1$, where the indexes $l_1$ and $l_0$ are separated from each other by 2 or more indexes to accommodate a pair of symbols at each anchor location. Example bitmaps and port number mappings for each pair of CSI-RS symbols and example locations for the pair of CSI-RS symbols, designated by indexes $l_0$ and $l_1$, are shown in FIG. 21.

Flexible Port Assignment

In order to control the port density in an aggregated CSI-RS resource, a flexible port assignment scheme is adopted in some embodiments of the presently disclosed techniques. With this approach, a network node can assign a variable number of ports to an aggregated resource within a CSI-RS resource.

If a small number of ports is assigned to a larger aggregated resource, then a high port density is achieved, since each port is represented in a large number of resource elements. This is useful in the case of large sub-carrier spacing. Hence, it is possible to control the port density D (defined as number of resource elements per port per resource block) depending on the use case with this configuration.

Several examples are shown in each box in FIG. 17. For example, in the $3^{rd}$ box from the left on the bottom row, the assignment of 4 ports, 8 ports, and 16 ports is shown. In each of these aggregations, there are 16 REs, hence the port density, D, in the three cases is 4, 2, and 1 REs/port/PRB, respectively. In all cases when the number of ports is less than the number of REs, the port density is greater than 1 RE/port/PRB. This is beneficial for larger subcarrier spacings so as to maintain similarly spaced samples of the channel in the frequency domain compared to the case if a smaller subcarrier spacing was used.

Figure 18:
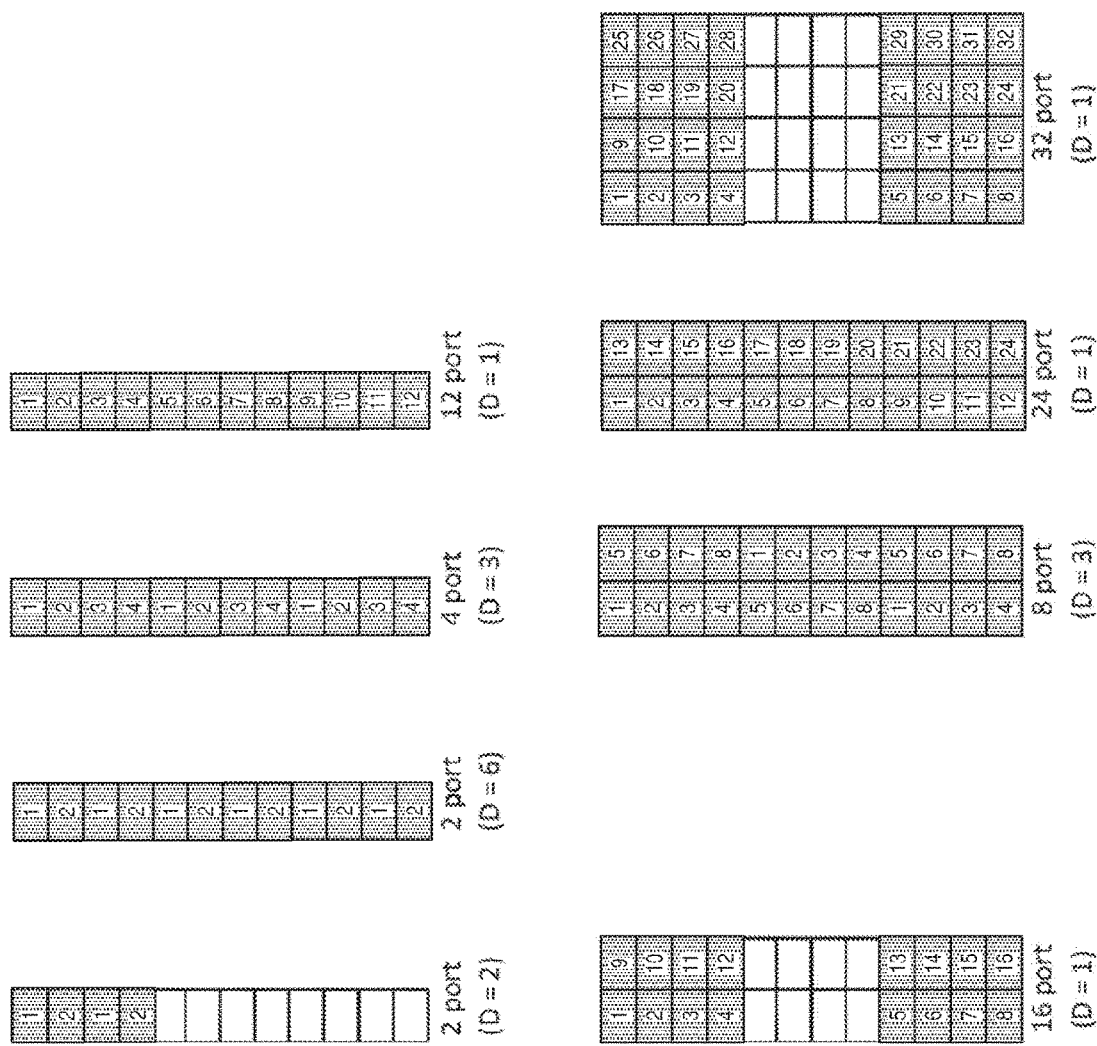
FIG. 18 is a graphical illustration of various example port number mappings that correspond to the resource allocation configurations of FIG. 17.

FIG. 18 shows example port number mappings for several of the resource allocations shown in FIG. 17. In one embodiment, the port numbers are mapped across frequency first (CSI-RS units) and then across time (OFDM symbols). As can be seen, a given port number appears D times within the resource which is consistent with the definition of port density in terms of REs/port/PRB.

Flexible Resource Subsampling

In the previous two subsections entitled "Flexible Resource Aggregation" and "Flexible Port Assignment," methods for achieving flexible and controllable density D of greater than or equal to 1 RE/port/PRB is described. In this subsection, a second aspect of certain embodiments is described whereby flexible density reduction capable of producing densities of less than 1 RE/port/PRB is described (D<1). This is useful for several purposes. One is for beam management purposes, where often a beam sweep is used to discover the "direction" of the UE for use in beamforming future control and data transmissions. For this type of application, it is useful to have a relatively sparse CSI-RS density in the frequency dimension. A reason is that often analog beamforming is used (at high carrier frequencies such as 28 GHz), and the beam is thus wideband and the corresponding RE used for an CSI-RS antenna port can be spread out over the bandwidth (low frequency sampling rate).

Another application for spare CSI-RS density is in scenarios where the channel varies relatively slowly in the frequency dimension, hence frequent sampling in frequency is not necessary. A sparser pattern can lead to higher data transmission peak rates since more resources are available for multiplexing data symbols with the CSI-RS symbols.

Flexible and controllable density reduction also for D<1 is achieved in certain embodiments of the invention by subsampling the aggregated CSI-RS resource by a subsampling factor SF=1, 2, 3, 4, . . . where SF=1 means no subsampling and SF>1 means that a CSI-RS symbol is located at most every SF subcarriers in the frequency domain. Subsampling results in a frequency "comb" structure where the spacing of the comb tines is equal to SF.

Figure 19:
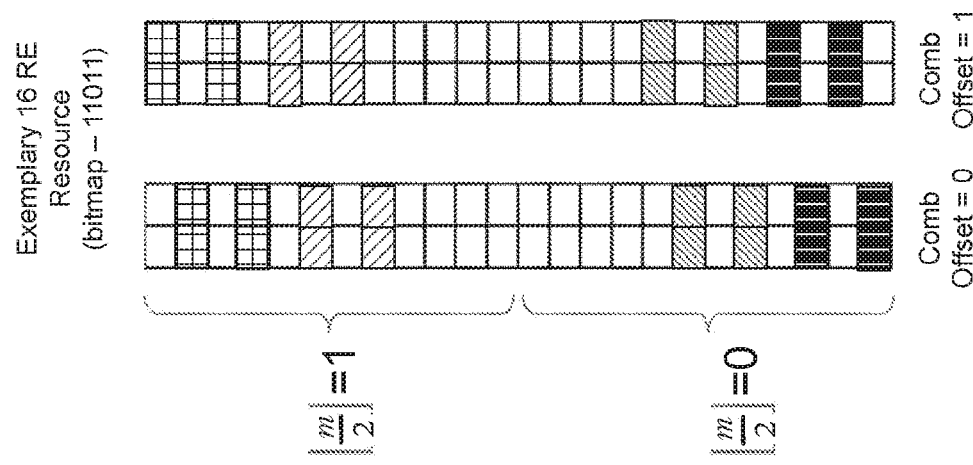
FIG. 19 is a graphical illustration of two possible comb patterns or structures resulting from a subsampling of an aggregated CSI-RS resource.

FIG. 19 shows an example comb for a 16 RE resource using SF=2 (two different comb offsets that are possible for SF=2 are shown). If 16 ports are assigned to this aggregated resource, then the use of SF=2 results in a density of D=½ which is less than 1 RE/port/PRB as desired.

When such a comb structure is used, there are SF−1 possibilities for introducing an offset of the comb. In FIG. 19 the two possible comb patterns are shown, one with no offset and one with offset value O=1. Use of a comb offset can be beneficial in order to allocate orthogonal combs to two different users—another motivation for density reduction.

Note that in FIG. 19, the value m is a PRB index where m spans a particular bandwidth. This may be the whole system bandwidth or a portion thereof, for example a partial band allocated to a given user. In this example, the CSI-RS units span two different PRBs, since subsampling with SF=2 is used. Generally, the number of PRBs spanned by the CSI-RS units is equal to SF.

Figure 20:
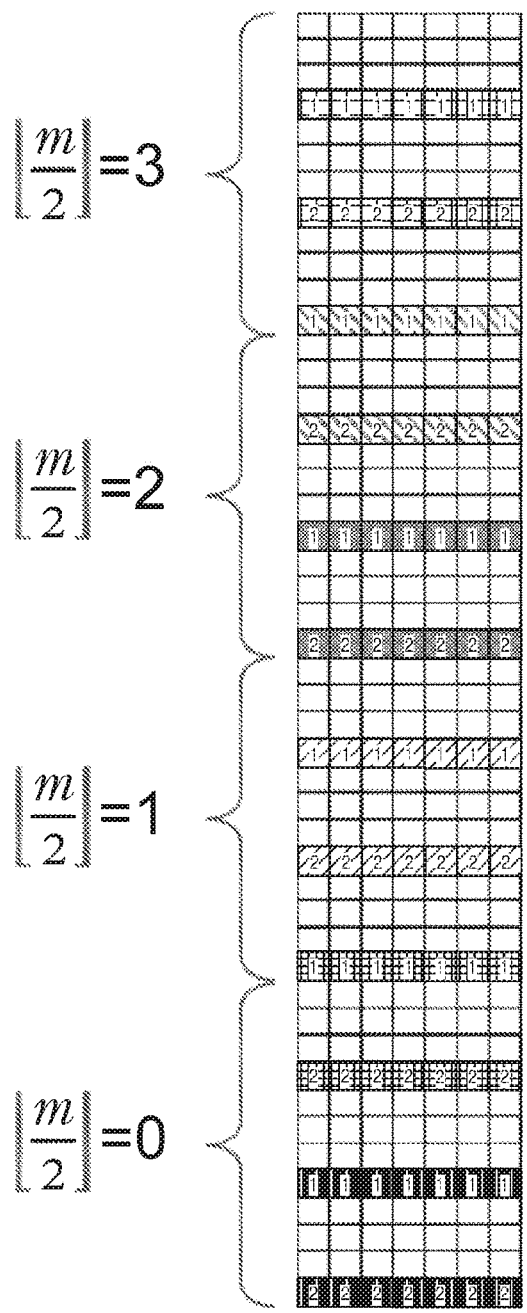
FIG. 20 is a graphical illustration of another possible comb pattern or structure resulting from a subsampling of an aggregated CSI-RS resource.

Yet another example of resource subsampling is shown FIG. 20 where subsampling factor SF=4 is used on a pattern using all 6 CSI-RS units (bitmap=111111) and 2 ports are assigned. With zero samples in between the "stripes" in this figure, the pattern is referred to as interleaved frequency division multiple access (IFDMA). This type of pattern is useful for beam sweeping operations performed in the context of beam management. Here, a different eNB transmit (Tx) beam can be used in each OFDM symbol. Then within each OFDM symbol, the UE can sweep its Rx beam 4 times (equal to the SF) since the IFDMA pattern creates a periodic time domain waveform with period=4 within each OFDM symbol.

Sub-sampling may alternatively be done on a per PRB basis rather than a per RE basis. For example, if a subsampling factor SF=2 is used, then the CSI-RS symbols are located in every second PRB and a CSI-RS density of D=½ is achieved. Additionally, a comb offset (in number of PRBs) can be used in a similar way as for an RE-level comb. However, the comb offset would be measured in number of PRBs (1, . . . , SF−1) rather than number of REs.

Using the above techniques allows for a very flexible and scalable definition of an CSI-RS resource for NR which can support a wide range of carrier frequencies (1-100 GHz), implementation choices (digital or analog beamforming). For example, embodiments of the presently disclosed techniques allow for definition of the CSI-RS resource according to one or more of the following aspects:

Aggregated resource units in frequency domain (one OFDM symbol)

Described by a length-6 bitmap indicating a particular combination of unit 1, 2, 3, 4, 5, and 6

Aggregated resource units in time domain

OFDM symbol indices over which to aggregate

Number of ports assigned to the aggregated resource

Subsample factor SF=1, 2, 3, 4, . . . and Comb Offset=0, 1, . . . , SF−1

A frequency band for which the CSI-RS resource is allocated (partial band, whole band)

OCC configuration (if used).

The described embodiments may be implemented in any appropriate type of communication system supporting any suitable communication standards and using any suitable components. As one example, certain embodiments may be implemented in an LTE network, such as that illustrated in FIG. 1.

Referring to FIG. 1, a communication network 100 comprises a plurality of wireless communication devices 105 (e.g., conventional UEs, machine type communication [MTC]/machine-to-machine [M2M] UEs) and a plurality of radio access nodes 110 (e.g., eNodeBs or other base stations). Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2:
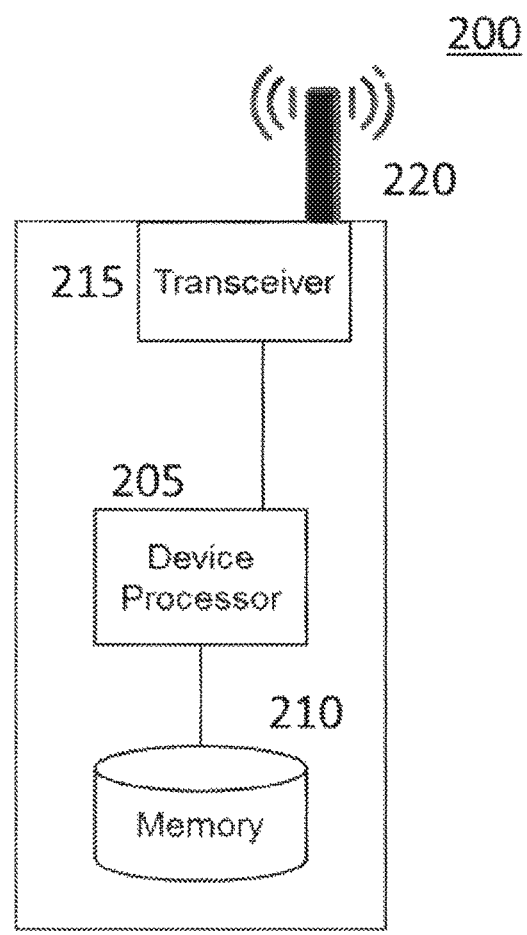
FIG. 2 is a diagram illustrating a wireless communication device.

Although wireless communication devices 105 may represent communication devices that include any suitable combination of hardware and/or software, these wireless communication devices may, in certain embodiments, represent devices such as an example wireless communication device illustrated in greater detail by FIG. 2. Similarly, although the illustrated radio access node may represent network nodes that include any suitable combination of hardware and/or software, these nodes may, in particular embodiments, represent devices such as the example radio access node illustrated in greater detail by FIG. 3.

Referring to FIG. 2, a wireless communication device 200 comprises a processor 205, a memory, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2.

Figure 24:
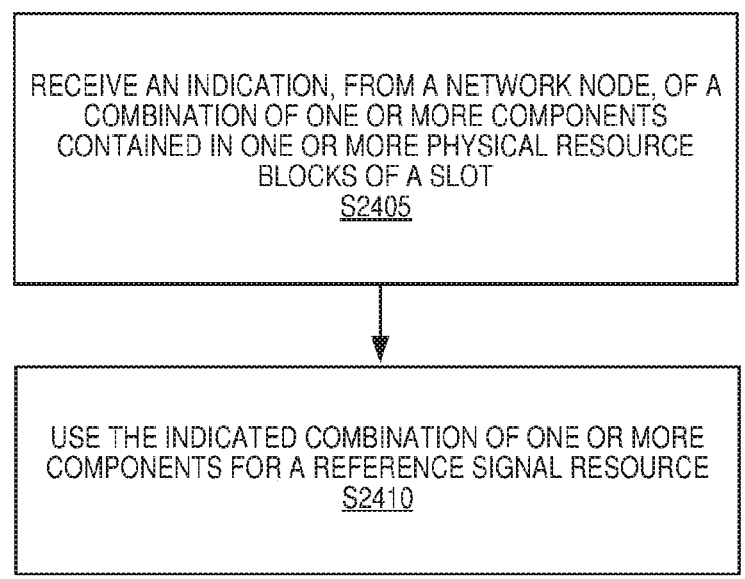
FIG. 24 is a flowchart illustrating a method of operating a wireless device.

Alternative embodiments may include additional components beyond those shown in FIG. 2 that may be responsible for providing certain aspects of the device's functionality, including any of the functionality described herein and in particular in FIG. 24. It will be appreciated that the device processor 205 may comprise one or more microprocessors, microcontrollers, digital signal processors, and the like, with these one or more processing elements being configured to execute program code stored in memory 210, to control the transceiver 215 and to execute all or some of the functionality described herein, and may include, in some embodiments, hard-coded digital logic that carries out all or some of the functionality described herein, e.g., including the process steps shown in FIG. 24. The term "processing circuit" is used herein to refer to any one of these combinations of processing elements.

Figure 3:
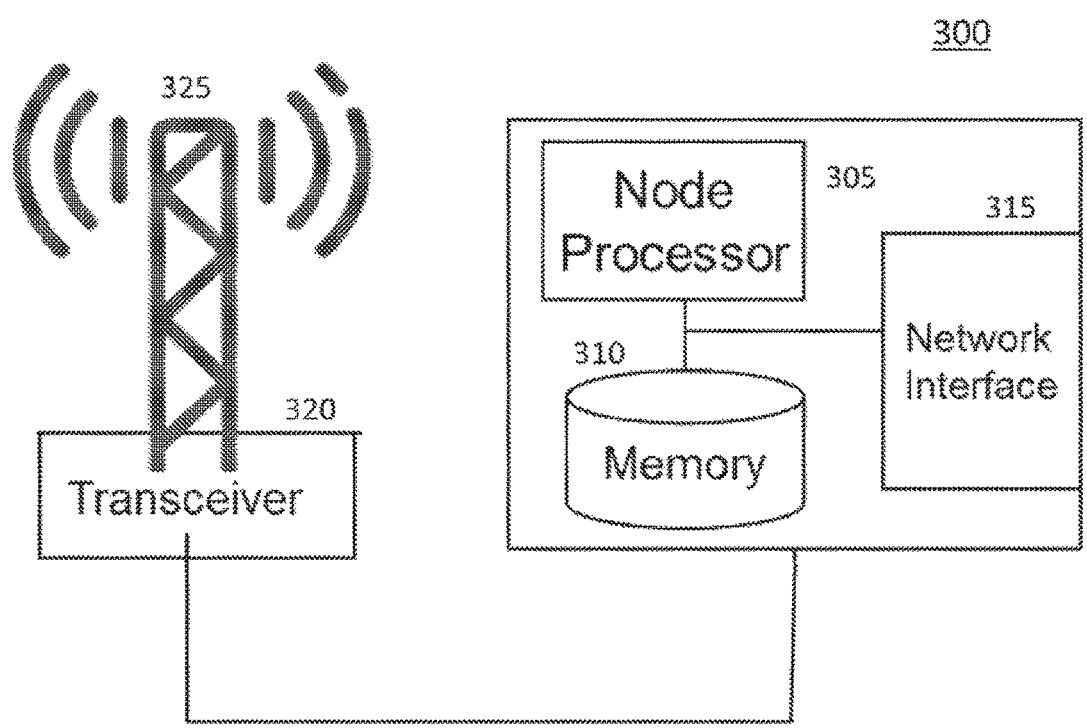
FIG. 3 is a diagram illustrating a radio access node.

Referring to FIG. 3, a radio access node 300 comprises a node processor 305, a memory 310, a network interface 315, a transceiver 320, and an antenna 325. Again, it will be appreciated that the node processor 305 may comprise one or more microprocessors, microcontrollers, digital signal processors, and the like, with these one or more processing elements being configured to execute program code stored in memory 310, to control the transceiver 320 and the network 315 and to execute all or some of the functionality described herein, and may include, in some embodiments, hard-coded digital logic that carries out all or some of the functionality described herein. This functionality includes, for example, the operations shown in the flowcharts of FIGS. 4, 5, and 22. The term "processing circuit" is used herein to refer to any one of these combinations of processing elements.

Thus, in certain embodiments, some or all of the functionality described as being provided by a base station, a node B, an enodeB, and/or any other type of network node may be provided by node processor 305 executing instructions stored on a computer-readable medium, such as memory 310 shown in FIG. 3. Again, this functionality includes, for example, the operations shown in the flowcharts of FIGS. 4, 5, and 22. Alternative embodiments of radio access node 300 may comprise additional components to provide additional functionality, such as the functionality described herein and/or related supporting functionality.

Figure 4:
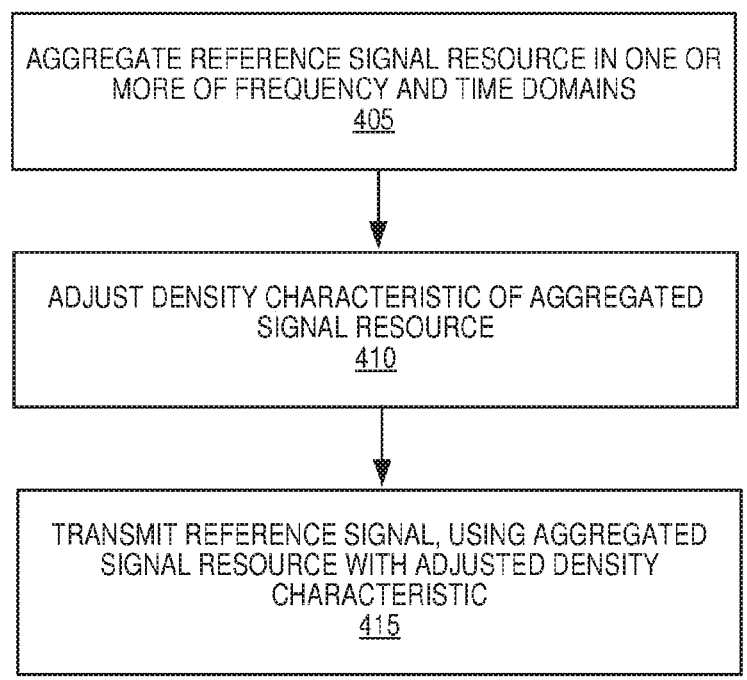
FIG. 4 is a flowchart illustrating a method of operating a network node.

FIG. 4 is a flowchart illustrating an example method 400 of operating a network node (e.g., a radio access node 110). The method 400 comprises a step 405 in which a reference signal resource is aggregated in one or more of a frequency and a time domain. The method further comprises a step 410 in which a density characteristic of the aggregated reference signal resource that is to be transmitted to the one or more wireless devices (105) is adjusted. The method further comprises a step 415 in which a reference signal is transmitted to each of the one or more wireless devices (105), using the aggregated reference signal resource with the adjusted density characteristic. The method may still further comprise, in some embodiments, signaling an indication of the aggregated reference signal resource with the density characteristic to the one or more wireless devices (105).

Figure 5:
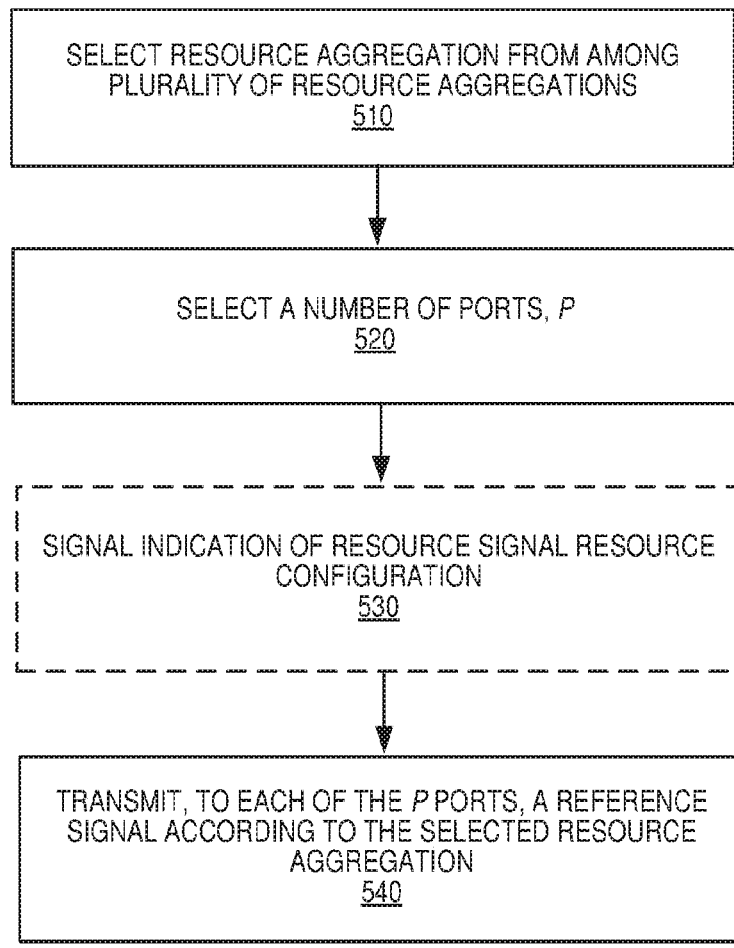
FIG. 5 is a diagram illustrating a network node.
Figure 6:
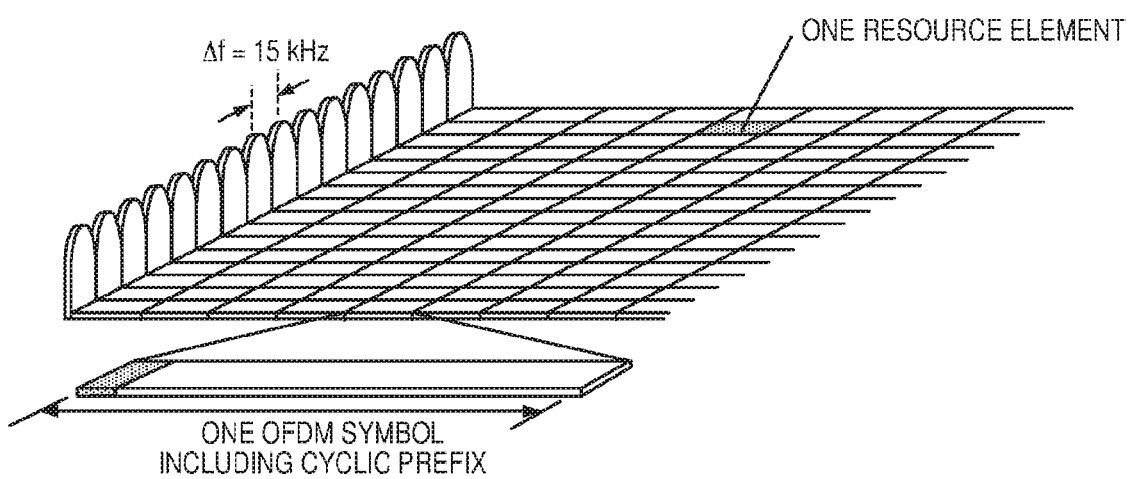
FIG. 6 is a schematic diagram of an example Orthogonal Frequency Division Multiplexing (OFDM) downlink physical resource.
Figure 7:
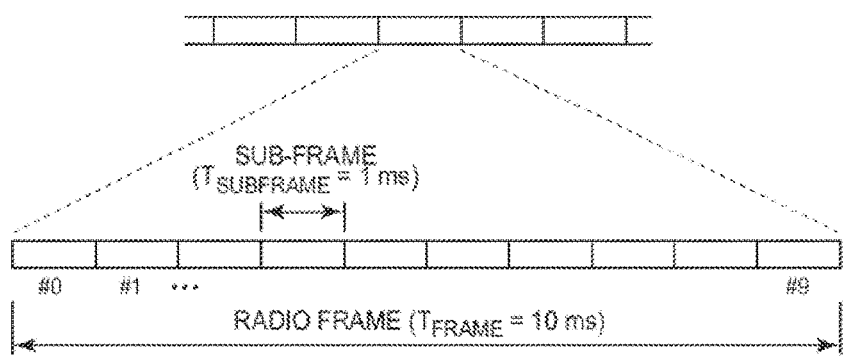
FIG. 7 is a schematic diagram of an example OFDM time-domain structure.
Figure 8:
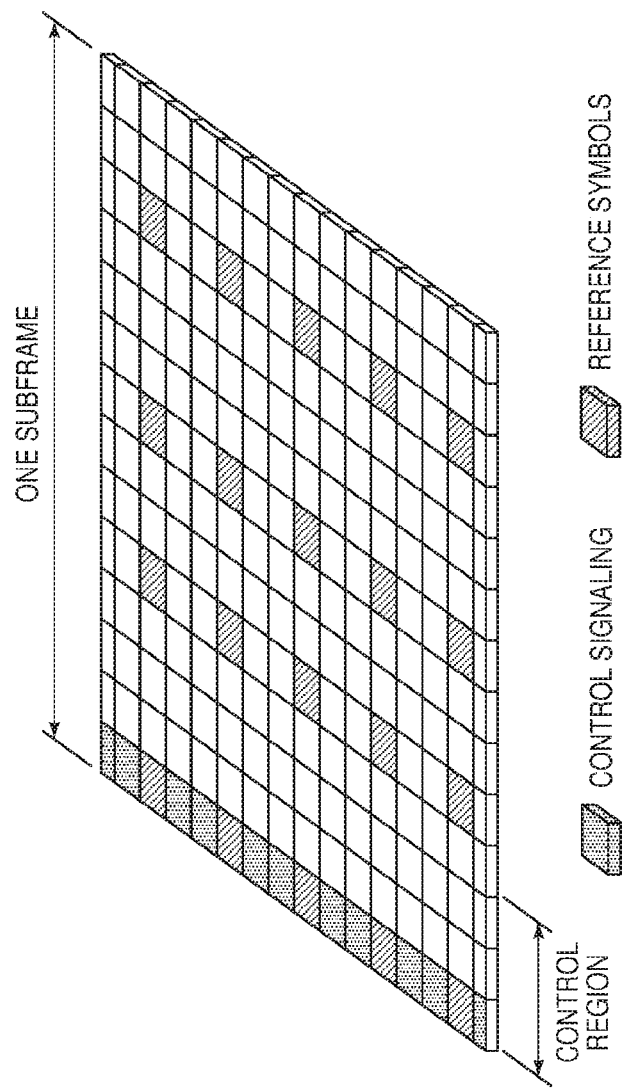
FIG. 8 is a schematic diagram of an example OFDM downlink subframe.
Figure 9:
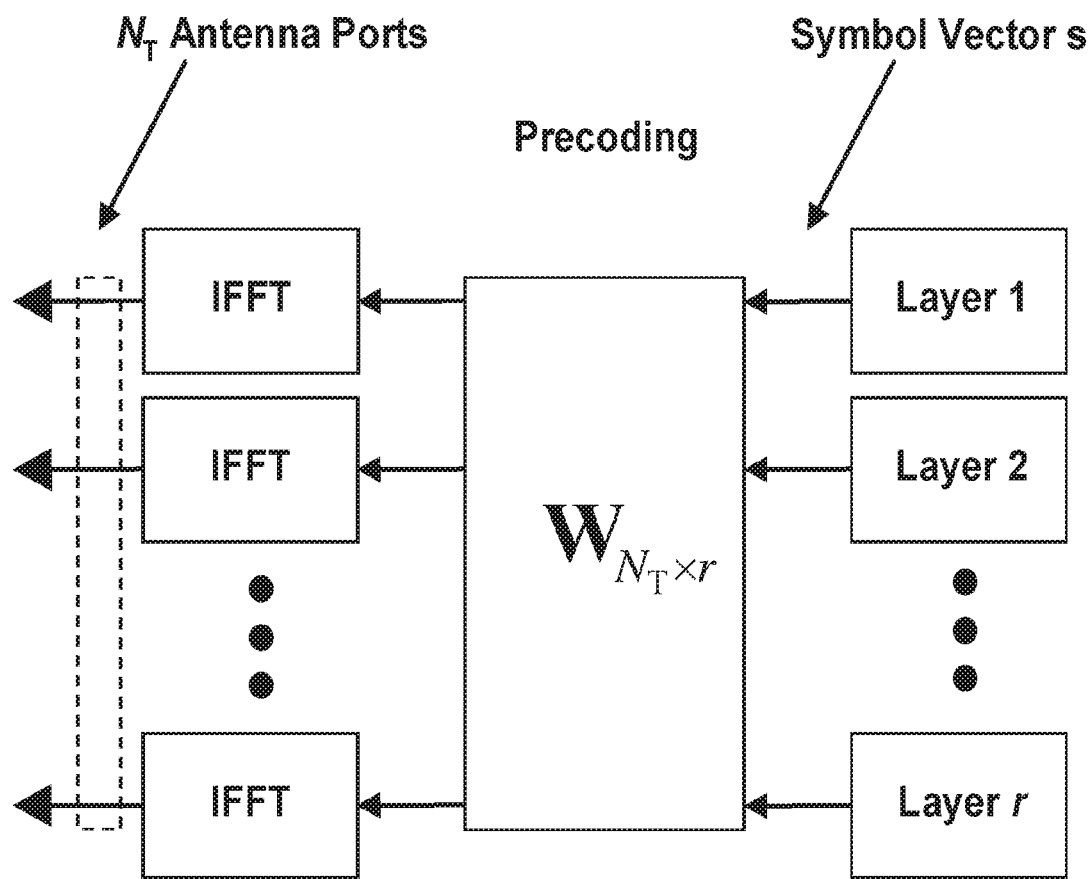
FIG. 9 is a functional block diagram of a spatial multiplexing operation.
Figure 10:
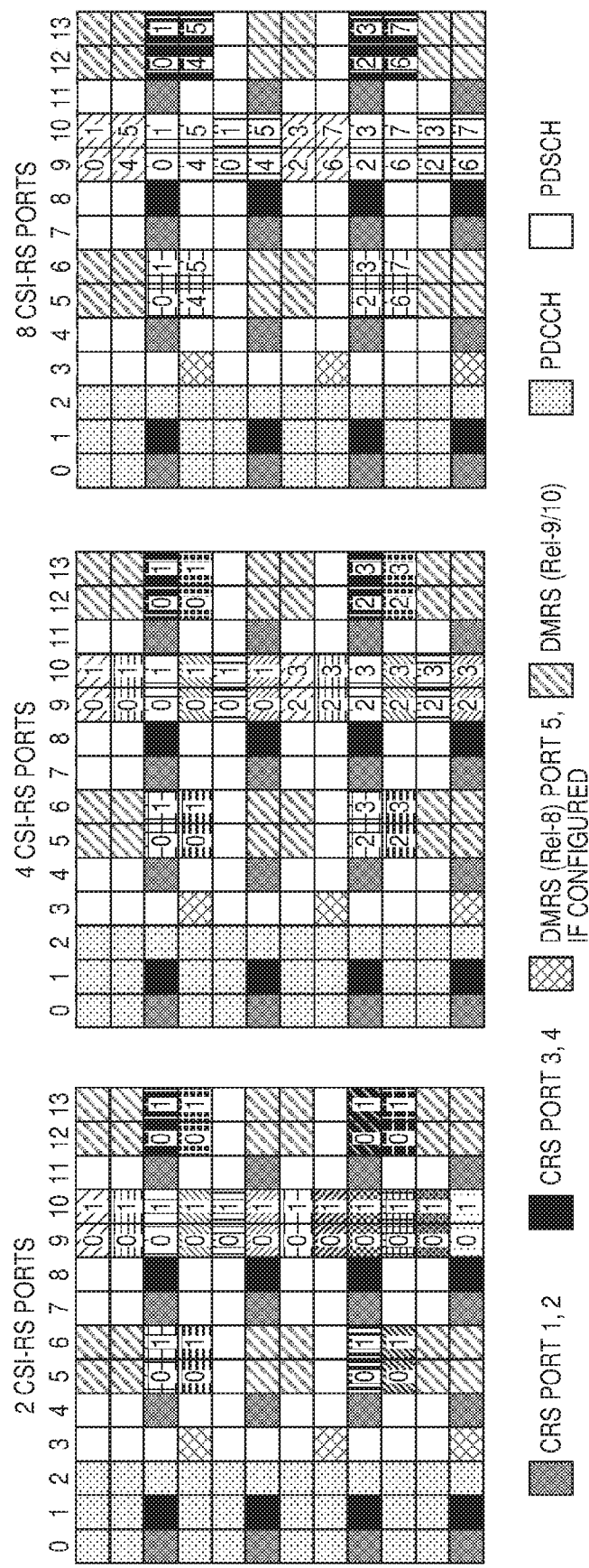
FIG. 10 is a graphical illustration of an example resource element grids over an RB pair.
Figure 11:
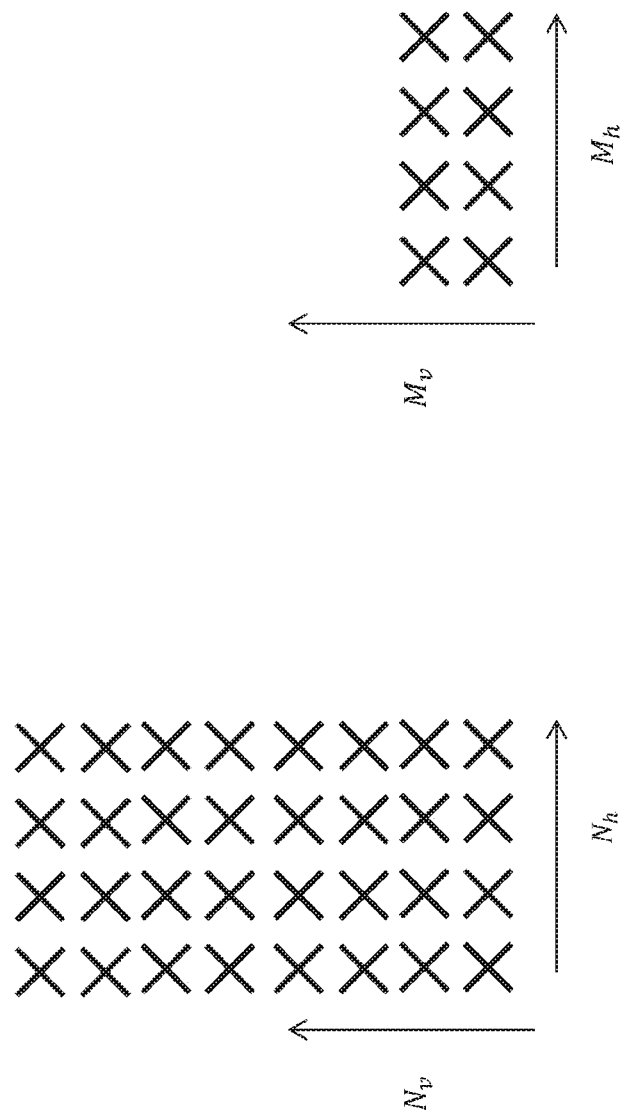
FIG. 11 is a graphical illustration of an example antenna array and its corresponding port layout.
Figure 12:
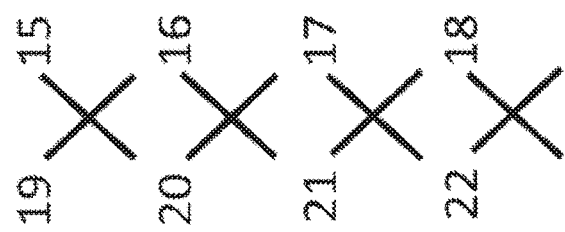
FIG. 12 is a graphical illustration of an example numbering scheme for antenna ports.

FIG. 5 illustrates another flowchart, this flowchart showing an example method 500, in a network node (110) of a wireless communication network, of selectively configuring variable density reference signal resources used to transmit reference signals for measurement by a wireless device in the wireless communications network, according to one or more of the techniques described herein.

As seen at block 510, the illustrated method comprises selecting a resource aggregation from among a plurality of resource aggregations, where each of the plurality of differing resource aggregations has a differing number of resource units and comprises a first number i of OFDM symbols that carry resource units within each transmission slot and a second number j of resource units per each of the first number of OFDM symbols, per each of one or more resource blocks. Each resource block comprises a predetermined number of subcarriers in the frequency domain and spans a transmission slot in the time domain.

As seen at block 520, the method further comprises selecting a third number p of ports, among which the resource units within each resource block are allocated. With the performing of the steps shown in blocks 510 and 520, as described above, a reference signal resource configuration having a reference signal port density D per resource block is thereby configured.

As seen at block 540, the method further comprises transmitting, for each of the p ports, a reference signal to the wireless device in at least one transmission slot, using the resource units allocated to the respective port in the plurality of resource blocks. In some embodiments, the method may further comprise signaling an indication of the reference signal resource configuration to the wireless device, as shown at block 530.

In some embodiments, the resource units referred to above each consist of two adjacent OFDM resource elements. In some embodiments, the first number i of OFDM symbols within each transmission slot are contiguous.

In some embodiments, transmitting the reference signal for each of the p ports comprises applying an orthogonal cover code to a predetermined signal sequence before transmitting the reference signal. In some embodiments, the method further comprises selecting a subsampling factor SF from a plurality of subsampling factors, each subsampling factor corresponding to a different minimum spacing of reference signal symbols in the frequency domain, thereby defining a reduced density reference signal configuration having a reduced reference signal port density D' per resource block, where D'=D/SF. In these embodiments, transmitting the reference signal to the wireless device in at least one transmission slot comprises transmitting the reference signals according to the reduced density reference signal configuration.

Figure 22:
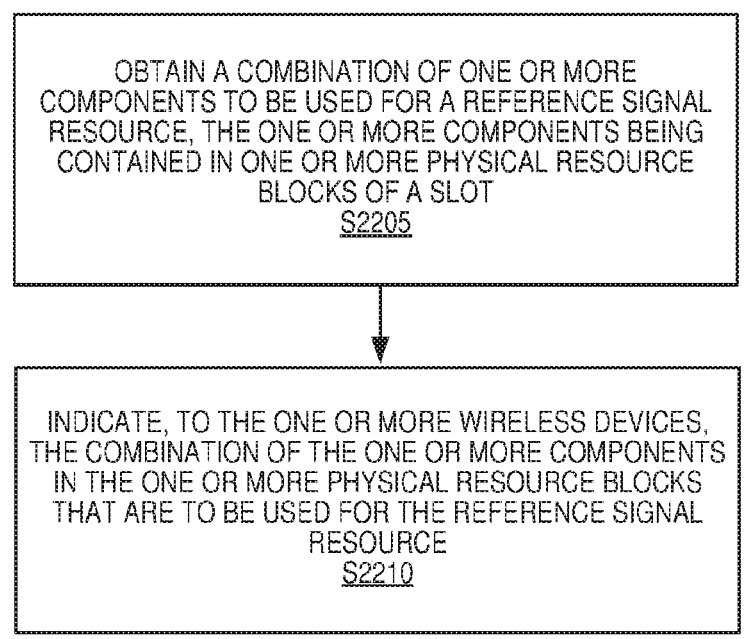
FIG. 22 is a flowchart illustrating a method of operating a network node.

FIG. 22 is a flowchart illustrating another method 2200 of operating a network node. The method 2200 comprises a step S2205 in which a combination of one or more units or components to be used for a reference signal resource is obtained. The combination may be obtained based on one or more criteria and/or predetermined rules including, for example, a desired density characteristic of the reference signal resource, a number of ports configured for one or more wireless devices by which the reference signal resource will be used. As discussed above, this obtaining may comprise aggregating the one or more components across two or more physical resource blocks, to form the reference signal resource. This aggregating may be done such that there is one, or several, REs per port, per PRB among the PRBs used to carry the reference signal. The method further comprises a step S2210 in which the combination of the one or more components in the one or more physical resource blocks that are to be used for the reference signal resource are indicated to one or more wireless devices (105).

In some embodiments of the method illustrated generally in FIG. 22, each physical resource block spans a plurality of subcarriers, and indicating the combination of the one or more components includes indicating one or more subcarrier indexes. In some embodiments, the one or more subcarrier indexes are indicated to the one or more wireless devices using one or more bitmaps. In some of these embodiments, each bit in the bitmap uniquely corresponds to a subcarrier index, such that a set bit in the bitmap indicates that a component located at a subcarrier index corresponding to the set bit is part of the combination of one or more components used for the reference signal resource. In some embodiments, the number of bits in each of the one or more bitmaps depends on a number of subcarriers in a component. In some embodiments, the number of bits in each of the one or more bitmaps may be half the number of subcarriers in the PRB, for example.

In some embodiments, each of the components corresponds to two or more subcarriers, the two or more subcarriers of each component being adjacent in frequency. In some of these embodiments, each component may also correspond to two or more adjacent symbols.

The reference signal resource in the above method may be a CSI-RS resource, in some embodiments. This CSI-RS resource may be used by the one or more wireless devices to perform CSI measurements, for example. In some embodiments, the reference signal resource is used to perform at least one of link adaptation for the one or more wireless devices and beam management for the one or more wireless devices. This beam management may include beam selection, such as selection of a transmit beam transmitted by a network node and/or a receive beam received by a wireless device.

Figure 23:
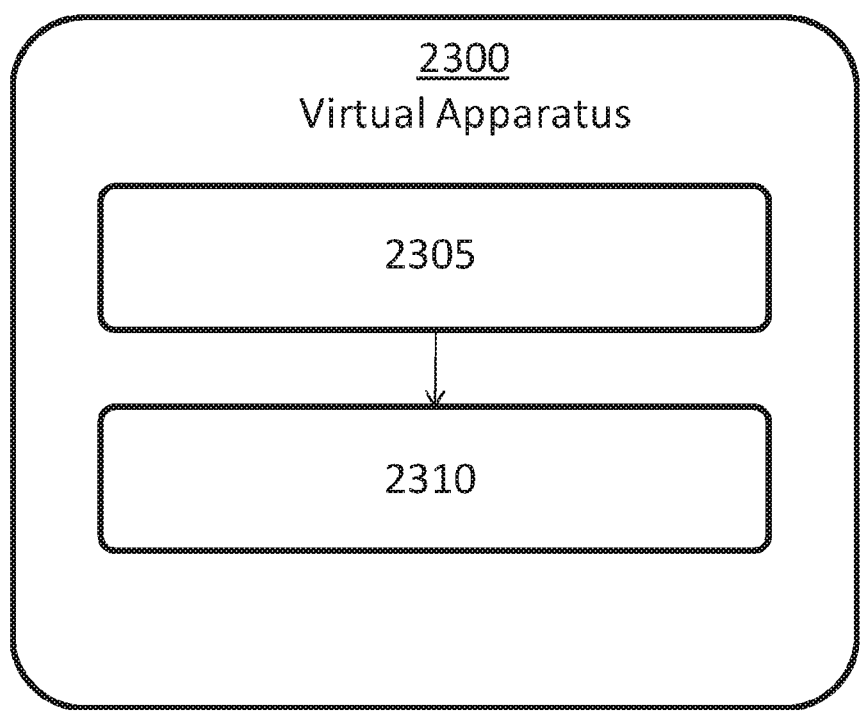
FIG. 23 is a graphical illustration of a virtual network node apparatus.

FIG. 23 illustrates a schematic block diagram of an apparatus 2300 in a wireless network (for example, the wireless network shown in FIG. 1). The apparatus may be implemented in a network node (e.g., network node 110 shown in FIG. 1). Apparatus 2300 is operable to carry out the example method described with reference to FIG. 22 and possibly any other processes or methods disclosed herein. It is also to be understood that the method of FIG. 22 is not necessarily carried out solely by apparatus 2300. At least some operations of the method can be performed by one or more other entities.

Virtual Apparatus 2300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to perform the functionality of obtaining unit 2305 and indicating unit 2310, and any other suitable units of apparatus 2300 to perform corresponding functions according to one or more embodiments of the present disclosure.

As illustrated in FIG. 23, apparatus 2300 includes obtaining unit 2305 and indicating unit 2310. Obtaining unit 2305 is configured to obtain a combination of one or more units or components to be used for a reference signal resource and indicating unit 2310 is configured to indicate the combination of the one or more components in the one or more physical resource blocks that are to be used for the reference signal resource to one or more wireless devices (105).

FIG. 24 is a flowchart illustrating a method 2400 of operating a wireless device. The method 2400 comprises a step S2405 in which an indication is received, from a network node, of a combination of one or more components contained in one or more physical resource blocks of a slot. The method further comprises a step S2410 in which the indicated combination of one or more components is used for a reference signal resource.

In some embodiments, the indicated combination consists of one RE per port, per physical resource block of the one or more physical resource blocks of the slot. In some embodiments, each physical resource block spans a plurality of subcarriers, and the indication of the combination of the one or more components includes an indication of one or more subcarrier indexes. In some of these latter embodiments, the indication of the one or more subcarrier indexes may include one or more bitmaps. The number of bits in each of the one or more bitmaps may depend on a number of subcarriers in a component. In some embodiments, each bit in the bitmap uniquely corresponds to a subcarrier index, such that a set bit in the bitmap indicates that a component located at a subcarrier index corresponding to the set bit is part of the combination of one or more components used for the reference signal resource. In some of these embodiments, the number of bits in each of the one or more bitmaps is half a number of subcarriers in the physical resource block.

In some embodiments, each of the components corresponds to two or more subcarriers, the two or more subcarriers of each component being adjacent in frequency. In some of these embodiments, each component may also correspond to two or more adjacent symbols.

The reference signal resource in the above method may be a CSI-RS resource, in some embodiments. This CSI-RS resource may be used by the one or more wireless devices to perform CSI measurements, for example. In some embodiments, the reference signal resource is used to perform at least one of link adaptation for the one or more wireless devices and beam management for the one or more wireless devices. This beam management may include beam selection, such as selection of a transmit beam transmitted by a network node and/or a receive beam received by the wireless device.

Figure 25:
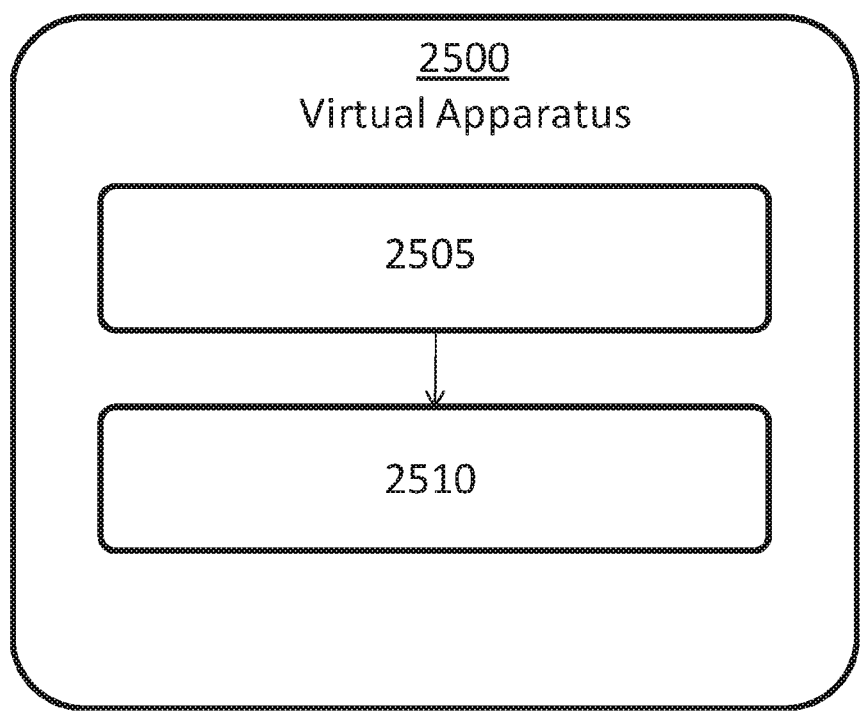
FIG. 25 is a graphical illustration of a virtual wireless device apparatus.

FIG. 25 illustrates a schematic block diagram of an apparatus 2500 in a wireless network (for example, the wireless network shown in FIG. 1). The apparatus may be implemented in a wireless device (e.g., wireless device 105 shown in FIGS. 1 and 2). Apparatus 2300 is operable to carry out the example methods described with reference to FIGS. 4, 5, and 24, and possibly any other processes or methods disclosed herein. It is also to be understood that the method of FIG. 24 is not necessarily carried out solely by apparatus 2500. At least some operations of the method can be performed by one or more other entities.

Virtual Apparatus 2500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to perform the functionality of receiving unit 2505 and using unit 2510, and any other suitable units of apparatus 2500 to perform corresponding functions according to one or more embodiments of the present disclosure.

As illustrated in FIG. 25, apparatus 2500 includes receiving unit 2505 and using unit 2510. Receiving unit 2505 is configured to receive an indication, from a network node, of a combination of one or more components contained in one or more physical resource blocks of a slot. Using unit 2510 is configured to use the indicated combination of one or more components for a reference signal resource.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Operation in Virtualization Environments

Figure 26:
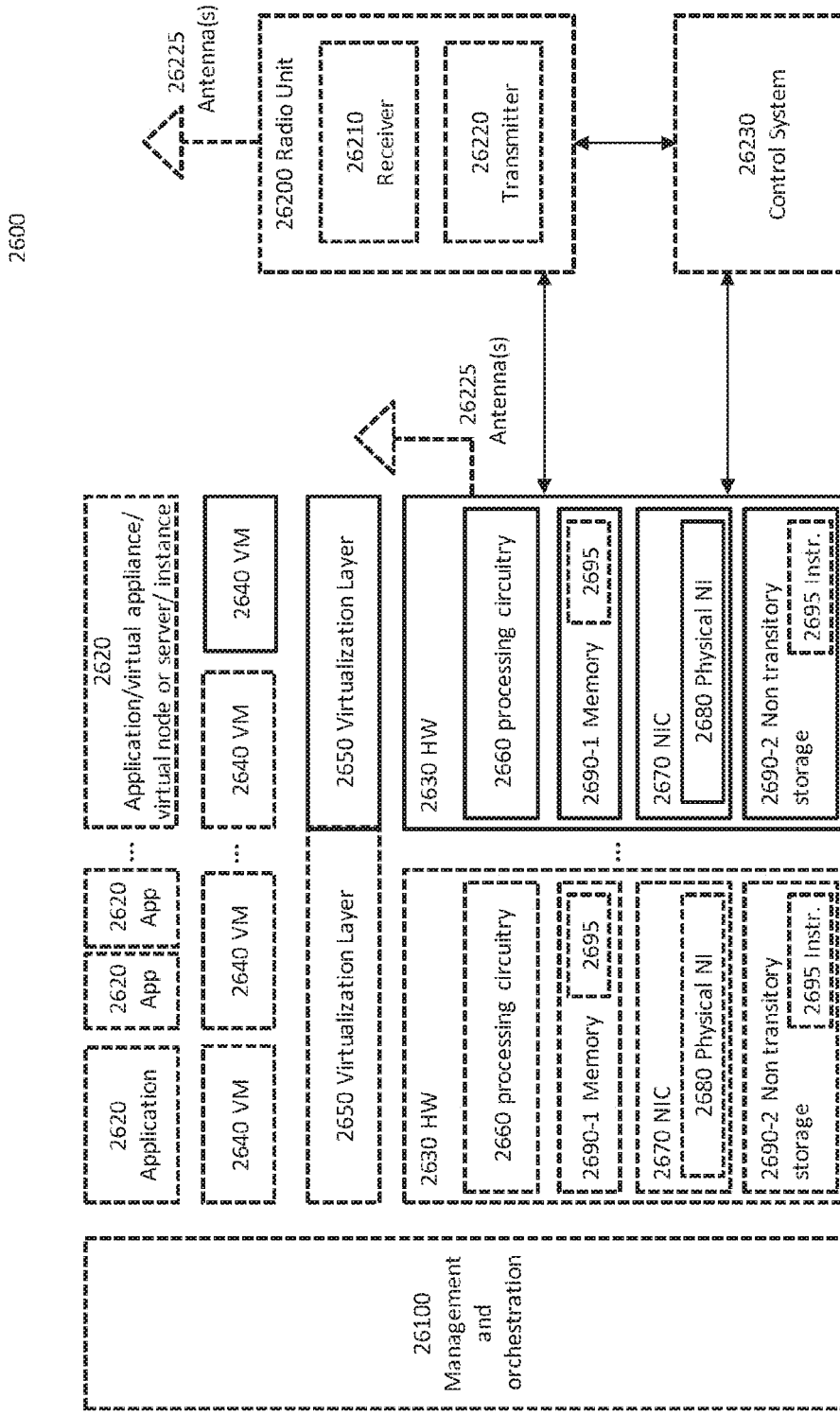
FIG. 26 is a graphical illustration of an example virtualization environment in which embodiments of the invention may operate.

FIG. 26 is a schematic block diagram illustrating a virtualization environment 2600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2600 hosted by one or more of hardware nodes 2630. Further, in embodiments in which the virtual node is not a radio access node or does not require radio connectivity (e.g., a core network node), then the network node may be entirely virtualized.

The functions may be implemented by one or more applications 2620 (which may alternatively be called software instances, virtual appliances, network functions, virtual nodes, virtual network functions, etc.) operative to implement some of the features, functions, and/or benefits of some of the embodiments disclosed herein. Applications 2620 are run in virtualization environment 2600 which provides hardware 2630 comprising processing circuitry 2660 and memory 2690. Memory 2690 contains instructions 2695 executable by processing circuitry 2660 whereby application 2620 is operative to provide one or more of the features, benefits, and/or functions disclosed herein.

Virtualization environment 2600, comprises general-purpose or special-purpose network hardware devices 2630 comprising a set of one or more processors or processing circuitry 2660, which may be commercial off-the-shelf (COTS) processors, dedicated Application Specific Integrated Circuits (ASICs), or any other type of processing circuitry including digital or analog hardware components or special purpose processors. Each hardware device may comprise memory 2690-1 which may be non-persistent memory for temporarily storing instructions 2695 or software executed by processing circuitry 2660. Each hardware device may comprise one or more network interface controllers (NICs) 2670, also known as network interface cards, which include physical network interface 2680. Each hardware device may also include non-transitory, persistent, machine-readable storage media 2690-2 having stored therein software 2695 and/or instructions executable by processing circuitry 2660. Software 2695 may include any type of software including software for instantiating one or more virtualization layers 2650 (also referred to as hypervisors), software to execute virtual machines 2640 as well as software allowing it to execute functions, features and/or benefits described in relation with some embodiments described herein.

Virtual machines 2640, comprise virtual processing, virtual memory, virtual networking or interface and virtual storage, and may be run by a corresponding virtualization layer 2650 or hypervisor. Different embodiments of the instance of virtual appliance 2620 may be implemented on one or more of virtual machines 2640, and the implementations may be made in different ways.

During operation, processing circuitry 2660 executes software 2695 to instantiate the hypervisor or virtualization layer 2650, which may sometimes be referred to as a virtual machine monitor (VMM). Virtualization layer 2650 may present a virtual operating platform that appears like networking hardware to virtual machine 2640.

As shown in FIG. 26, hardware 2630 may be a standalone network node with generic or specific components. Hardware 2630 may comprise antenna 26225 and may implement some functions via virtualization. Alternatively, hardware 2630 may be part of a larger cluster of hardware (e.g. such as in a data center or customer premise equipment (CPE)) where many hardware nodes work together and are managed via management and orchestration (MANO) 26100, which, among others, oversees lifecycle management of applications 2620.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 2640 may be a software implementation of a physical machine that runs programs as if they were executing on a physical, non-virtualized machine. Each of virtual machines 2640, and that part of hardware 2630 that executes that virtual machine, be it hardware dedicated to that virtual machine and/or hardware shared by that virtual machine with others of the virtual machines 2640, forms a separate virtual network elements (VNE).

Still in the context of NFV, Virtual Network Function (VNF) is responsible for handling specific network functions that run in one or more virtual machines 2640 on top of hardware networking infrastructure 2630 and corresponds to application 2620 in FIG. 26.

In some embodiments, one or more radio units 26200 that each include one or more transmitters 26220 and one or more receivers 26210 may be coupled to one or more antennas 26225. Radio units 26200 may communicate directly with hardware nodes 2630 via one or more appropriate network interfaces and may be used in combination with the virtual components to provide a virtual node with radio capabilities, such as a radio access node or a base station.

In some embodiments, some signaling can be effected with the use of control system 26230 which may alternatively be used for communication between the hardware nodes 2630 and radio units 26200.

Operation with Remote Host Computers

Figure 27:
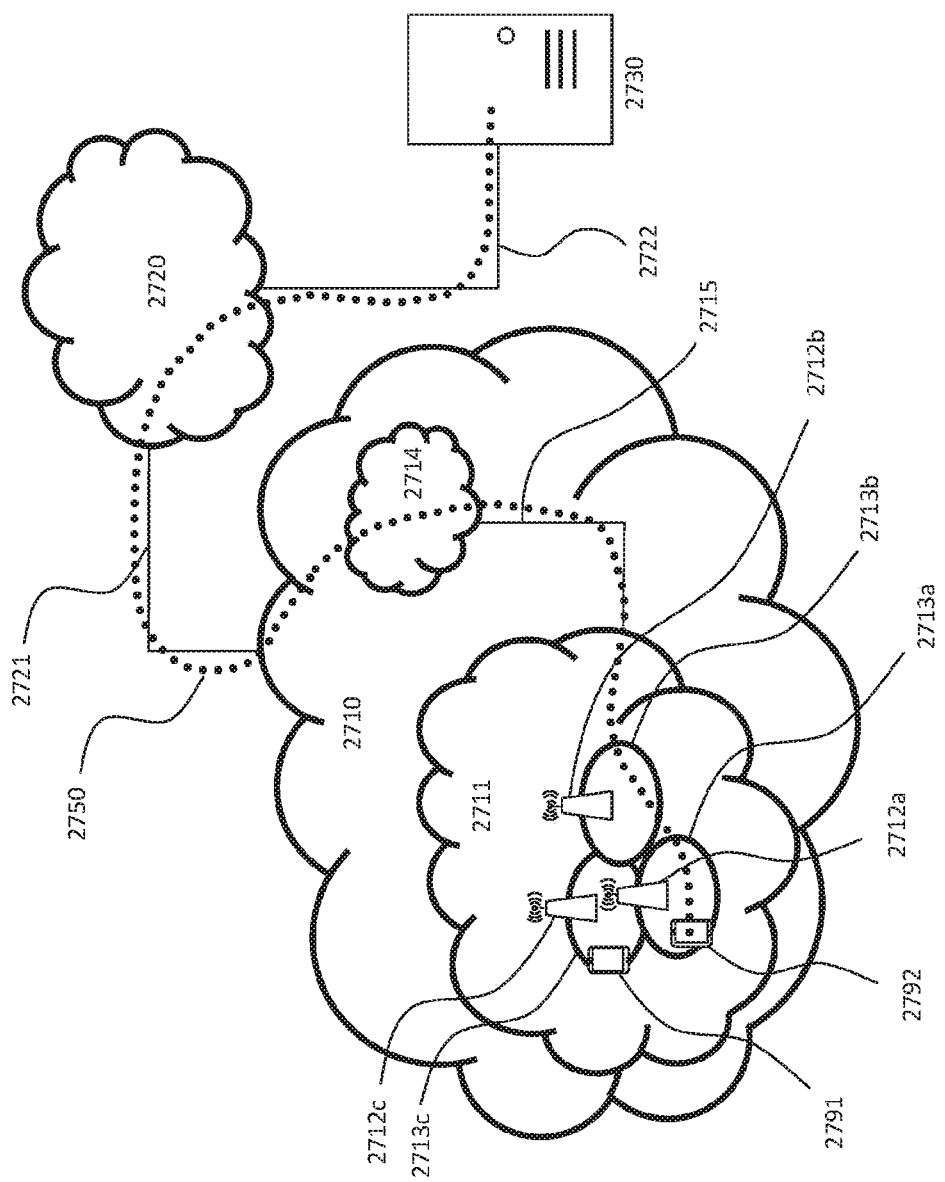
FIG. 27 is a graphical illustration of a telecommunication network connected via an intermediate network to a host computer in accordance with some embodiments.

With reference to FIG. 27, in accordance with an embodiment, a communication system includes telecommunication network 2710, such as a 3GPP-type cellular network, which comprises access network 2711, such as a radio access network, and core network 2714. Access network 2711 comprises a plurality of base stations 2712*a*, 2712*b*, 2712*c*, such as NBs, eNBs, gNBs or other types of wireless access points, each defining a corresponding coverage area 2713*a*, 2713*b*, 2713*c*. Each base station 2712*a*, 2712*b*, 2712*c* is connectable to core network 2714 over a wired or wireless connection 2715. A first UE 2791 located in coverage area 2713*c* is configured to wirelessly connect to, or be paged by, the corresponding base station 2712*c*. A second UE 2792 in coverage area 2713*a* is wirelessly connectable to the corresponding base station 2712*a*. While a plurality of UEs 2791, 2792 are illustrated in this example, the disclosed embodiments are equally applicable to a situation where a sole UE is in the coverage area or where a sole UE is connecting to the corresponding base station 2712.

Telecommunication network 2710 is itself connected to host computer 2730, which may be embodied in the hardware and/or software of a standalone server, a cloud-implemented server, a distributed server or as processing resources in a server farm. Host computer 2730 may be under the ownership or control of a service provider, or may be operated by the service provider or on behalf of the service provider. Connections 2721 and 2722 between telecommunication network 2710 and host computer 2730 may extend directly from core network 2714 to host computer 2730 or may go via an optional intermediate network 2720. Intermediate network 2720 may be one of, or a combination of more than one of, a public, private or hosted network; intermediate network 2720, if any, may be a backbone network or the Internet; in particular, intermediate network 2720 may comprise two or more sub-networks (not shown).

The communication system of FIG. 27 as a whole enables connectivity between the connected UEs 2791, 2792 and host computer 2730. The connectivity may be described as an over-the-top (OTT) connection 2750. Host computer 2730 and the connected UEs 2791, 2792 are configured to communicate data and/or signaling via OTT connection 2750, using access network 2711, core network 2714, any intermediate network 2720 and possible further infrastructure (not shown) as intermediaries. OTT connection 2750 may be transparent in the sense that the participating communication devices through which OTT connection 2750 passes are unaware of routing of uplink and downlink communications. For example, base station 2712 may not or need not be informed about the past routing of an incoming downlink communication with data originating from host computer 2730 to be forwarded (e.g., handed over) to a connected UE 2791. Similarly, base station 2712 need not be aware of the future routing of an outgoing uplink communication originating from the UE 2791 towards the host computer 2730.

Example implementations, in accordance with an embodiment, of the UE, base station and host computer discussed in the preceding paragraphs will now be described with reference to FIG. 28. In communication system 2800, host computer 2810 comprises hardware 2815 including communication interface 2816 configured to set up and maintain a wired or wireless connection with an interface of a different communication device of communication system 2800. Host computer 2810 further comprises processing circuitry 2818, which may have storage and/or processing capabilities. In particular, processing circuitry 2818 may comprise one or more programmable processors, application-specific integrated circuits, field programmable gate arrays or combinations of these (not shown) adapted to execute instructions. Host computer 2810 further comprises software 2811, which is stored in or accessible by host computer 2810 and executable by processing circuitry 2818. Software 2811 includes host application 2812. Host application 2812 may be operable to provide a service to a remote user, such as UE 2830 connecting via OTT connection 2850 terminating at UE 2830 and host computer 2810. In providing the service to the remote user, host application 2812 may provide user data which is transmitted using OTT connection 2850.

Communication system 2800 further includes base station 2820 provided in a telecommunication system and comprising hardware 2825 enabling it to communicate with host computer 2810 and with UE 2830. Hardware 2825 may include communication interface 2826 for setting up and maintaining a wired or wireless connection with an interface of a different communication device of communication system 2800, as well as radio interface 2827 for setting up and maintaining at least wireless connection 2870 with UE 2830 located in a coverage area (not shown in FIG. 28) served by base station 2820. Communication interface 2826 may be configured to facilitate connection 2860 to host computer 2810. Connection 2860 may be direct or it may pass through a core network (not shown in FIG. 28) of the telecommunication system and/or through one or more intermediate networks outside the telecommunication system. In the embodiment shown, hardware 2825 of base station 2820 further includes processing circuitry 2828, which may comprise one or more programmable processors, application-specific integrated circuits, field programmable gate arrays or combinations of these (not shown) adapted to execute instructions. Base station 2820 further has software 2821 stored internally or accessible via an external connection.

Communication system 2800 further includes UE 2830 already referred to. Its hardware 2835 may include radio interface 2837 configured to set up and maintain wireless connection 2870 with a base station serving a coverage area in which UE 2830 is currently located. Hardware 2835 of UE 2830 further includes processing circuitry 2838, which may comprise one or more programmable processors, application-specific integrated circuits, field programmable gate arrays or combinations of these (not shown) adapted to execute instructions. UE 2830 further comprises software 2831, which is stored in or accessible by UE 2830 and executable by processing circuitry 2838. Software 2831 includes client application 2832. Client application 2832 may be operable to provide a service to a human or non-human user via UE 2830, with the support of host computer 2810. In host computer 2810, an executing host application 2812 may communicate with the executing client application 2832 via OTT connection 2850 terminating at UE 2830 and host computer 2810. In providing the service to the user, client application 2832 may receive request data from host application 2812 and provide user data in response to the request data. OTT connection 2850 may transfer both the request data and the user data. Client application 2832 may interact with the user to generate the user data that it provides.

Figure 28:
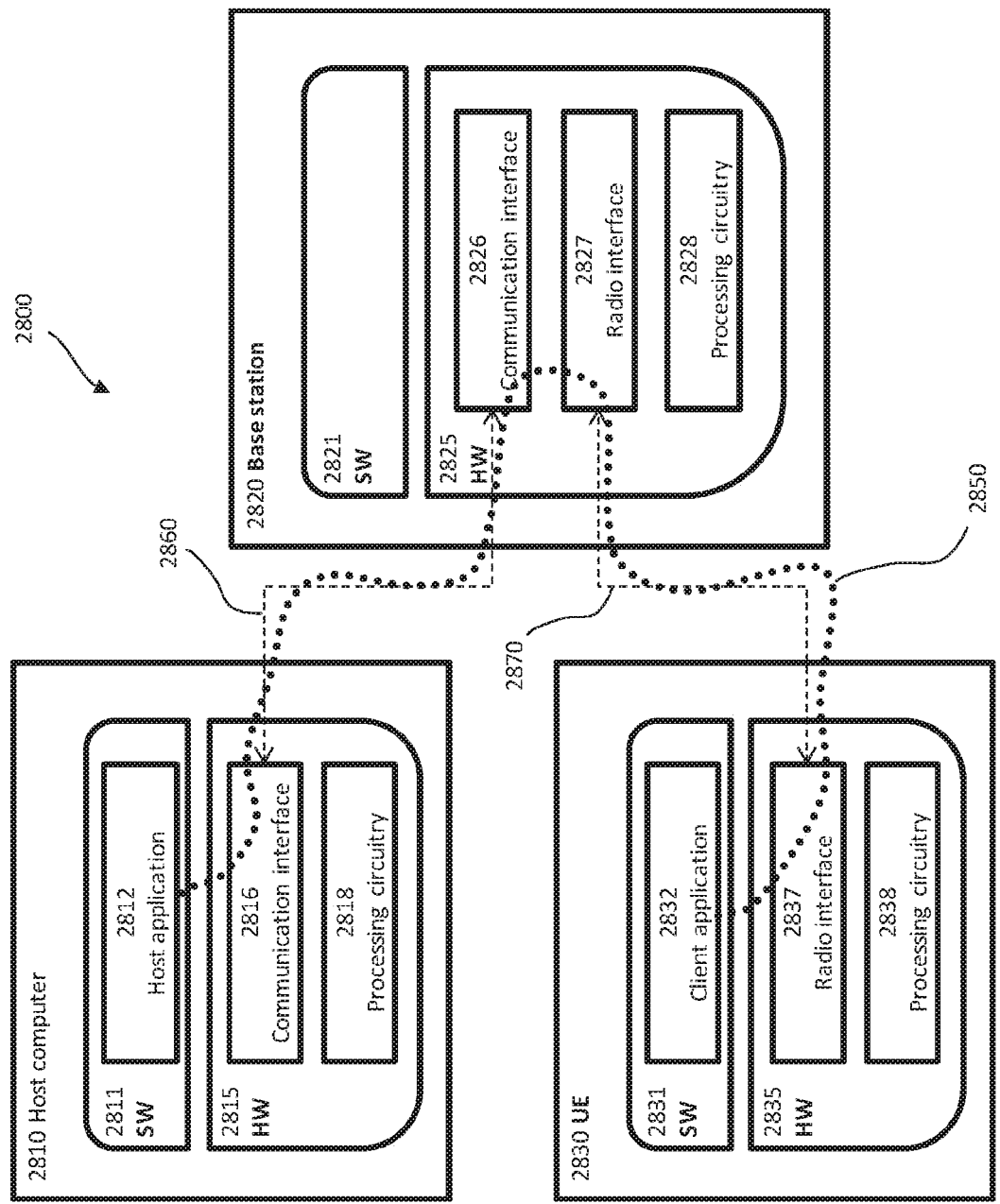
FIG. 28 is a graphical illustration of a host computer communicating via a base station with a user equipment over a partially wireless connection in accordance with some embodiments.

It is noted that host computer 2810, base station 2820 and UE 2830 illustrated in FIG. 28 may be similar or identical to host computer 2730, one of base stations 2712a, 2712b, 2712c and one of UEs 2791, 2792 of FIG. 27, respectively. This is to say, the inner workings of these entities may be as shown in FIG. 28 and independently, the surrounding network topology may be that of FIG. 27.

In FIG. 28, OTT connection 2850 has been drawn abstractly to illustrate the communication between host computer 2810 and UE 2830 via base station 2820, without explicit reference to any intermediary devices and the precise routing of messages via these devices. Network infrastructure may determine the routing, which it may be configured to hide from UE 2830 or from the service provider operating host computer 2810, or both. While OTT connection 2850 is active, the network infrastructure may further take decisions by which it dynamically changes the routing (e.g., on the basis of load balancing consideration or reconfiguration of the network).

Wireless connection 2870 between UE 2830 and base station 2820 is in accordance with the teachings of the embodiments described throughout this disclosure. One or more of the various embodiments improve the performance of OTT services provided to UE 2830 using OTT connection 2850, in which wireless connection 2870 forms the last segment. More precisely, the teachings of these embodiments may improve the data rate, among other things, and thereby provide benefits such as relaxed restrictions on file size/resolution and better responsiveness.

A measurement procedure may be provided for the purpose of monitoring data rate, latency and other factors on which the one or more embodiments improve. There may further be an optional network functionality for reconfiguring OTT connection 2850 between host computer 2810 and UE 2830, in response to variations in the measurement results. The measurement procedure and/or the network functionality for reconfiguring OTT connection 2850 may be implemented in software 2811 and hardware 2815 of host computer 2810 or in software 2831 and hardware 2835 of UE 2830, or both. In embodiments, sensors (not shown) may be deployed in or in association with communication devices through which OTT connection 2850 passes; the sensors may participate in the measurement procedure by supplying values of the monitored quantities exemplified above, or supplying values of other physical quantities from which software 2811, 2831 may compute or estimate the monitored quantities. The reconfiguring of OTT connection 2850 may include message format, retransmission settings, preferred routing etc.; the reconfiguring need not affect base station 2820, and it may be unknown or imperceptible to base station 2820. Such procedures and functionalities may be known and practiced in the art. In certain embodiments, measurements may involve proprietary UE signaling facilitating host computer 2810's measurements of throughput, propagation times, latency and the like. The measurements may be implemented in that software 2811 and 2831 causes messages to be transmitted, in particular empty or 'dummy' messages, using OTT connection 2850 while it monitors propagation times, errors etc.

Figure 29:
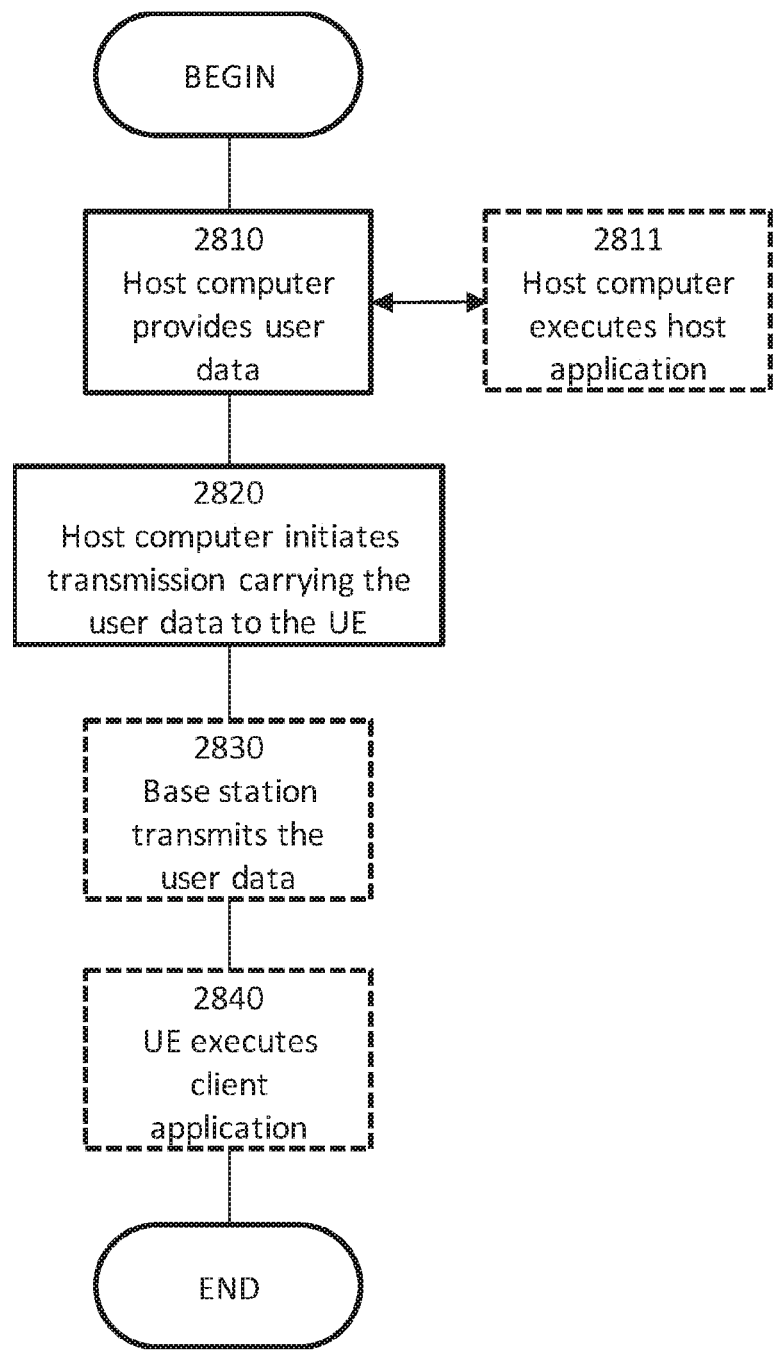
FIG. 29 is a flowchart illustrating a method implemented in a communication system including a host computer, a base station and a user equipment in accordance with some embodiments.

FIG. 29 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 29 will be included in this section. In step 2910, the host computer provides user data. In substep 2911 (which may be optional) of step 2910, the host computer provides the user data by executing a host application. In step 2920, the host computer initiates a transmission carrying the user data to the UE. In step 2930 (which may be optional), the base station transmits to the UE the user data which was carried in the transmission that the host computer initiated, in accordance with the teachings of the embodiments described throughout this disclosure. In step 2940 (which may also be optional), the UE executes a client application associated with the host application executed by the host computer.

Figure 30:
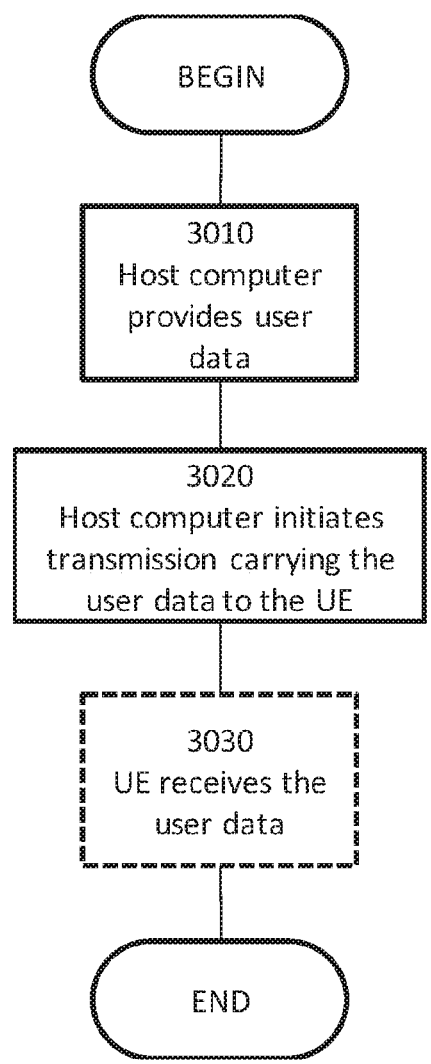
FIG. 30 is a flowchart illustrating another method implemented in a communication system including a host computer, a base station and a user equipment in accordance with some embodiments

FIG. 30 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 30 will be included in this section. In step 3010 of the method, the host computer provides user data. In an optional substep (not shown) the host computer provides the user data by executing a host application. In step 3020, the host computer initiates a transmission carrying the user data to the UE. The transmission may pass via the base station, in accordance with the teachings of the embodiments described throughout this disclosure. In step 3030 (which may be optional), the UE receives the user data carried in the transmission As described above, the exemplary embodiments provide both methods and corresponding apparatuses consisting of various modules providing functionality for performing the steps of the methods. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer-readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more buses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Example Embodiments

While not being limited thereto, some example embodiments of the presently disclosed techniques and apparatus are provided below.

1. A method (400) of configuring, in a network node (110) of a wireless communication network (100), a reference signal resource in the wireless communication network (100), the method comprising:
obtaining (S2205) a combination of one or more components to be used for a reference signal resource, the one or more components being contained in one or more physical resource blocks of a slot; and
indicating (S2210), to the one or more wireless devices (105), the combination of the one or more components in the one or more physical resource blocks that are to be used for the reference signal resource.

2. The method of example embodiment 1, wherein the physical resource block spans a plurality of subcarriers, and wherein indicating the combination of the one or more components includes indicating one or more subcarrier indexes.

3. The method of example embodiment 2, wherein the one or more subcarrier indexes are indicated to the one or more wireless devices using one or more bitmaps.

4. The method of example embodiment 3, wherein each bit in the bitmap uniquely corresponds to a subcarrier index, such that a set bit in the bitmap indicates that a component located at a subcarrier index corresponding to the set bit is part of the combination of one or more components used for the reference signal resource.

5. The method of example embodiment 3, wherein a number of bits in each of the one or more bitmaps depends on a number of subcarriers in a component.

6. The method of example embodiment 5, wherein a number of bits in each of the one or more bitmaps is half a number of subcarriers in the physical resource block.

7. The method of example embodiment 5, wherein a number of bits in each of the one or more bitmaps is equal to one less than the number of subcarriers in the physical resource block.

8. The method of example embodiment any of example embodiments 1-7, wherein the reference signal resource is a CSI-RS resource.

9. The method of any of example embodiments 1-8, wherein each of the components corresponds to two or more subcarriers.

10. The method of example embodiment 9, wherein the two or more of subcarriers are adjacent in frequency.

11. The method of example embodiment 9, wherein each component corresponds to two or more adjacent symbols.

12. The method of any of example embodiments 1-11, wherein the reference signal resource is a CSI-RS resource.

13. The method of claim 12, wherein the CSI-RS resource is used to perform CSI measurements with the one or more wireless devices (105).

14. The method of any of example embodiments 1-13, wherein the reference signal resource is used to perform at least one of:
link adaptation for the one or more wireless devices (105), and
beam management for the one or more wireless devices (105).

15. The method of example embodiment 14, wherein the beam management includes beam selection.

16. The method of example embodiment 15, wherein the beam selection includes selection of a transmit beam transmitted by a network node (110) and/or a receive beam received by a wireless device (105).

17. A method (400) of obtaining, in a wireless device (105) of a wireless communication network (100), an indication of a reference signal resource in the wireless communication network (100), the method comprising:
receiving (S2405) an indication, from a network node (110), of a combination of one or more components contained in one or more physical resource blocks of a slot; and
using (S2410) the indicated combination of one or more components for a reference signal resource.

18. The method of example embodiment 17, wherein the physical resource block spans a plurality of subcarriers, and wherein the indication of the combination of the one or more components includes an indication of one or more subcarrier indexes.

19. The method of example embodiment 18, wherein the indication of the one or more subcarrier indexes includes one or more bitmaps.

20. The method of example embodiment 19, wherein each bit in the bitmap uniquely corresponds to a subcarrier index, such that a set bit in the bitmap indicates that a component located at a subcarrier index corresponding to the set bit is part of the combination of one or more components used for the reference signal resource.

21. The method of example embodiment 19, wherein a number of bits in each of the one or more bitmaps depends on a number of subcarriers in a component.

22. The method of example embodiment 21, wherein a number of bits in each of the one or more bitmaps is half a number of subcarriers in the physical resource block.

23. The method of example embodiment 21, wherein a number of bits in each of the one or more bitmaps is equal to one less than the number of subcarriers in the physical resource block.

24. The method of example embodiment any of example embodiments 17-23, wherein the reference signal resource is a CSI-RS resource.

25. The method of any of example embodiments 17-24, wherein each of the components corresponds to two or more subcarriers.

26. The method of example embodiment 25, wherein the two or more of subcarriers are adjacent in frequency.

27. The method of example embodiment 25, wherein each component corresponds to two or more adjacent symbols.

28. The method of any of example embodiments 17-25, wherein the reference signal resource is a CSI-RS resource.

29. The method of claim 28, wherein the CSI-RS resource is used to perform CSI measurements with the one or more wireless devices (105).

30. The method of any of example embodiments 17-29, wherein the reference signal resource is used to perform at least one of:
a. link adaptation for the one or more wireless devices (105), and
b. beam management for the one or more wireless devices (105).

31. The method of example embodiment 30, wherein the beam management includes beam selection.

32. The method of example embodiment 31, wherein the beam selection includes selection of a transmit beam transmitted by a network node (110) and/or a receive beam received by a wireless device (105).

33. A wireless device (105, 200) for facilitating communications in a wireless communication network (100) by obtaining an indication of a reference signal resource in the wireless communication network (100), the wireless device comprising processing circuitry configured to perform the steps of any of example embodiments 17-32.

34. A network node (110, 300) for configuring a reference signal resource in the wireless communication network (100), the network node comprising processing circuitry configured to perform the steps of any of example embodiments 1-16.

35. A user equipment (UE) (200) for facilitating communications in a wireless communication network (100) by obtaining an indication of a reference signal resource in the wireless communication network (100), the UE comprising:
an antenna (220) configured to send and receive wireless signals;
a transceiver (215) connected to the antenna and to processing circuitry (205), and configured to condition signals communicated between the antenna and the processing circuitry;
a. the processing circuitry being configured to perform the steps of any of example embodiments 17-32.

36. A communication system (2800) including a host computer (2810) comprising:
processing circuitry (2818) configured to provide user data; and
a communication interface (2816) configured to forward the user data to a cellular network for transmission to a wireless device (2830),
wherein the cellular network comprises a network node (2820) having:
a communication interface (2826) configured to receive the user data;
a radio interface (2827) configured to interface with a wireless device 2830 to forward the user data to the wireless device (2830); and
processing circuitry (2828) configured to perform the steps of any of example embodiments 1-16.

37. The communication system of any of the previous example embodiment further including the network node.

38. The communication system of any of the previous 2 example embodiments, further including the wireless device, wherein the wireless device is configured to communicate with the network node.

39. The communication system of any of the previous 3 example embodiments, wherein:
the processing circuitry of the host computer is configured to execute a host application, thereby providing the user data; and
the wireless device comprises processing circuitry configured to execute a client application associated with the host application.

40. A method implemented in a communication system including a host computer, a network node and a wireless device, the method comprising:
at the host computer, providing user data; and
at the host computer, initiating a transmission carrying the user data to the wireless device via a cellular network comprising the network node, wherein the network node performs the steps of any of example embodiments 1-16.

41. The method of the previous example embodiment, further comprising, at the network node, transmitting the user data.

42. The method of any of the previous 2 example embodiments, wherein the user data is provided at the host computer by executing a host application, the method further comprising, at the wireless device, executing a client application associated with the host application.

43. A communication system (2800) including a host computer (2810) and a wireless device (2830), the host computer comprising:
processing circuitry configured to provide user data; and
a communication interface configured to forward user data to a cellular network for transmission to a wireless device (2830),
wherein the wireless device (2830) comprises a transceiver and processing circuitry, the wireless device's components being configured to perform the steps of any of example embodiments 17-32.

44. The communication system of the previous example embodiment, wherein the cellular network further includes a network node (2820) configured to communicate with the wireless device.

45. The communication system of any of the previous 2 example embodiments, wherein:
the processing circuitry of the host computer is configured to execute a host application, thereby providing the user data; and
the wireless device's processing circuitry is configured to execute a client application associated with the host application.

46. A method implemented in a communication system (2800) including a host computer (2810), a network node (2820), and a wireless device (2830), the method comprising:
at the host computer, providing user data; and
at the host computer, initiating a transmission carrying the user data to the wireless device via a cellular network comprising the network node, wherein the wireless device performs the steps of any of example embodiments 17-32.

47. The method of the previous example embodiment, further comprising at the wireless device, receiving the user data from the network node.

LIST OF ABBREVIATIONS

TRP—Transmission/Reception Point
UE—User Equipment

NW—Network
BPL—Beam pair link
BLF—Beam pair link failure
BLM—Beam pair link monitoring
BPS—Beam pair link switch
RLM—radio link monitoring
RLF—radio link failure
PDCCH—Physical Downlink Control Channel
RRC—Radio Resource Control
CRS—Cell-specific Reference Signal
CSI-RS—Channel State Information Reference Signal
RSRP—Reference signal received power
RSRQ—Reference signal received quality
gNB—NR base station
PRB—Physical Resource Block
RE—Resource Element

The invention claimed is:

1. A communication system including a host computer comprising:
 processing circuitry configured to provide user data; and
 a communication interface configured to forward the user data to a cellular network for transmission to a user equipment (UE),
 wherein the cellular network comprises a base station having a radio interface and processing circuitry, the base station's processing circuitry configures a reference signal resource in the cellular network by:
  obtaining a combination of one or more components to be used for a reference signal resource, the one or more components being contained in one or more physical resource blocks of a slot;
  indicating, to one or more UEs, the combination of the one or more components in the one or more physical resource blocks that are to be used for the reference signal resource,
  wherein the physical resource block spans a plurality of subcarriers, and wherein indicating the combination of the one or more components includes indicating one or more subcarrier indexes,
  wherein the indication of the one or more subcarrier indexes includes a bitmap, and
  wherein each bit in the bitmap uniquely corresponds to a subcarrier index and a set bit in the bitmap indicates that a component located at a subcarrier index corresponding to the set bit is part of the combination of the one or more components used for the reference signal resource.

2. The communication system of claim 1, further including the base station.

3. The communication system of claim 2, further including the UE, wherein the UE is configured to communicate with the base station.

4. The communication system of claim 3, wherein
 the processing circuitry of the host computer is configured to execute a host application, thereby providing user data; and
 the UE comprises processing circuitry configured to execute a client application associated with the host application.

5. The communication system of claim 1, wherein the base station's processing circuitry configures the reference signal resource in the cellular network by:
 aggregating the one or more components across two or more physical resource blocks, to obtain the combination of the one or more components to be used for the reference signal resource.

6. The communication system of claim 1, wherein the base station's processing circuitry configures the reference signal resource in the cellular network by:
 aggregating one resource element (RE) per port, per physical resource block of the one or more physical resource blocks of the slot to obtain the combination of the one or more components to be used for the reference signal resource.

7. The communication system of claim 1, wherein a number of bits in the bitmap depends on a number of subcarriers in a component.

8. The communication system of claim 1, wherein the number of bits in the bitmap is half the number of subcarriers in the physical resource block.

9. The communication system of claim 1, wherein the reference signal resource is a CSI-RS resource.

10. The communication system of claim 1, wherein each of the one or more components corresponds to two or more subcarriers, the two or more subcarriers of each component being adjacent in frequency.

11. The communication system of claim 10, wherein each component corresponds to two or more adjacent symbols.

12. The communication system of claim 1, wherein the reference signal resource is used to perform at least one of:
 link adaptation for the one or more UEs, and
 beam management for the one or more UEs.

13. A method implemented in a communication system including a host computer, a base station and a user equipment (UE), the method comprising:
 at the host computer, providing user data; and
 at the host computer, initiating a transmission carrying the user data to the UE via a cellular network comprising the base station wherein the base station configures a reference signal resource in the cellular network by:
  obtaining a combination of one or more components to be used for a reference signal resource, the one or more components being contained in one or more physical resource blocks of a slot; and
  indicating, to one or more wireless devices, the combination of the one or more components in the one or more physical resource blocks that are to be used for the reference signal resource,
  wherein the physical resource block spans a plurality of subcarriers, and wherein indicating the combination of the one or more components includes indicating one or more subcarrier indexes,
  wherein the indication of the one or more subcarrier indexes includes a bitmap, and
  wherein each bit in the bitmap uniquely corresponds to a subcarrier index and a set bit in the bitmap indicates that a component located at a subcarrier index corresponding to the set bit is part of the combination of the one or more components used for the reference signal resource.

14. The method of claim 13, further comprising:
 at the base station, transmitting the user data.

15. The method of claim 13, wherein the user data is provided by the host computer by executing a host application,
 the method further comprising:
 at the UE, executing a client application associated with the host application.

16. The method of claim 13, wherein obtaining the combination of the one or more components to be used for a reference signal resource comprises aggregating the plurality of components across two or more physical resource blocks, to form the reference signal resource.

17. The method of claim 13, wherein obtaining the combination of the one or more components to be used for a reference signal resource comprises aggregating one resource element (RE) per port, per physical resource block of the one or more physical resource blocks of the slot to form the reference signal resource.

18. The method of claim 13, wherein a number of bits in the bitmap depends on a number of subcarriers in a component.

19. The method of claim 13, wherein the number of bits in the bitmap is half the number of subcarriers in the physical resource block.

20. The method of claim 13, wherein the reference signal resource is a CSI-RS resource.

21. The method of claim 13, wherein each of the components corresponds to two or more subcarriers, the two or more subcarriers of each component being adjacent in frequency.

22. The method of claim 21, wherein each component corresponds to two or more adjacent symbols.

23. The method of claim 13, wherein the reference signal resource is used to perform at least one of:
    link adaptation for the one or more wireless devices, and
    beam management for the one or more wireless devices.

* * * * *

UNITED STATES PATENT AND TRADEMARK OFFICE
CERTIFICATE OF CORRECTION

PATENT NO. : 11,038,645 B2
APPLICATION NO. : 16/860771
DATED : June 15, 2021
INVENTOR(S) : Grant et al.

Page 1 of 1

It is certified that error appears in the above-identified patent and that said Letters Patent is hereby corrected as shown below:

In the Specification

In Column 3, Line 8, delete "Symbols" and insert -- Signal --, therefor.

In Column 3, Line 9, delete "$N_R$," and insert -- NR, --, therefor.

In Column 3, Line 13, delete "Symbols" and insert -- Signal --, therefor.

In Column 7, Line 3, delete "$N_R$" and insert -- NR --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*